US012163357B2

(12) United States Patent
Felix

(10) Patent No.: US 12,163,357 B2
(45) Date of Patent: Dec. 10, 2024

(54) SEALED CONNECTION DEVICE BETWEEN TWO ENCLOSED VOLUMES WITH IMPROVED SECURITY

(71) Applicant: GETINGE LA CALHENE, Vendome (FR)

(72) Inventor: Julien Felix, Vendôme (FR)

(73) Assignee: GETINGE LIFE SCIENCE FRANCE, Vendôme (FR)

( * ) Notice: Subject to any disclaimer, the term of this patent is extended or adjusted under 35 U.S.C. 154(b) by 483 days.

(21) Appl. No.: 17/603,405

(22) PCT Filed: Apr. 10, 2020

(86) PCT No.: PCT/EP2020/060325
§ 371 (c)(1),
(2) Date: Oct. 13, 2021

(87) PCT Pub. No.: WO2020/212283
PCT Pub. Date: Oct. 22, 2020

(65) Prior Publication Data

US 2022/0178172 A1 Jun. 9, 2022

(30) Foreign Application Priority Data

Apr. 16, 2019 (FR) ....................................... 1904029

(51) Int. Cl.
*E05B 65/00* (2006.01)
*G21F 7/005* (2006.01)

(52) U.S. Cl.
CPC ........ *E05B 65/001* (2013.01); *E05B 65/0003* (2013.01); *E05B 65/006* (2013.01); *G21F 7/005* (2013.01)

(58) Field of Classification Search
CPC .. E05B 65/001; E05B 65/0003; E05B 65/006; G21F 7/005
See application file for complete search history.

(56) References Cited

U.S. PATENT DOCUMENTS 9,440,229 B2 * 9/2016 Nodin .................... C12M 37/04
11,879,548 B2 * 1/2024 Belin ...................... B01L 3/563
(Continued)

FOREIGN PATENT DOCUMENTS

CN 105518803 A 4/2016
CN 206405664 U 8/2017
(Continued)

OTHER PUBLICATIONS

Russian Office Action dated Aug. 31, 2023 for Russian Patent Application No. 2021133047.
(Continued)

*Primary Examiner* — Michael P Ferguson
*Assistant Examiner* — Thomas L Neubauer
(74) *Attorney, Agent, or Firm* — Pearne & Gordon LLP

(57) ABSTRACT

Assembly including a first volume and a device for connection between the first volume and a second volume, the first volume including a first flange and a first door, and the second enclosed volume including a second flange and a second door, the connection device including a securing and disengaging mechanism intended to secure the first and second doors and to disengage the second door from its flange, the mechanism including a plate mounted on the first door. The assembly also including an immobilisation mechanism for immobilising the plate relative to the first door in a position in the absence of the second door and in another position in the presence of the second door in a state of securing the first and second doors, and unlocking the second door relative to the second flange.

16 Claims, 19 Drawing Sheets

(56) References Cited

U.S. PATENT DOCUMENTS

| | | | | |
|---|---|---|---|---|
| 2014/0291995 | A1 | 10/2014 | Chavrot | |
| 2016/0201382 | A1* | 7/2016 | Dufour | E05C 19/00 49/68 |
| 2016/0208527 | A1* | 7/2016 | Dufour | G21F 7/005 |
| 2016/0281418 | A1* | 9/2016 | Dufour | B01L 1/02 |
| 2016/0354772 | A1 | 12/2016 | Nodin | |
| 2022/0178172 | A1* | 6/2022 | Felix | E05B 65/001 |

FOREIGN PATENT DOCUMENTS

| | | | |
|---|---|---|---|
| CN | 208017961 | U | 10/2018 |
| EP | 3 259 760 | A1 | 12/2017 |
| FR | 2 978 363 | A1 | 2/2013 |
| FR | 3010118 | A1 | 3/2015 |
| FR | 3010120 | A1 | 3/2015 |
| JP | 2014-532018 | A | 12/2014 |
| JP | 2016-539342 | A | 12/2016 |
| RU | 2 604 454 | C2 | 12/2016 |
| RU | 2 642 822 | C2 | 1/2018 |
| WO | 2016131851 | A1 | 8/2016 |

OTHER PUBLICATIONS

Search Report issued in French Patent Application No. 1904029 dated Mar. 6, 2020.

International Search Report for issued in Application No. PCT/EP2020/060325 dated Jun. 16, 2020.

Written Opinion for PCT/EP2020/060325 dated Jun. 16, 2020.

Japanese Office Action dated Nov. 29, 2023 in corresponding Japanese Patent Application No. 2021-560065.

Corresponding Chinese Patent Application No. 202080036943.3, English translation of Search Report dated Jun. 24, 2024.

Corresponding Chinese Patent Application No. 202080036943.3, English translation of First Office Action dated Jun. 26, 2024.

* cited by examiner

FIG.13A
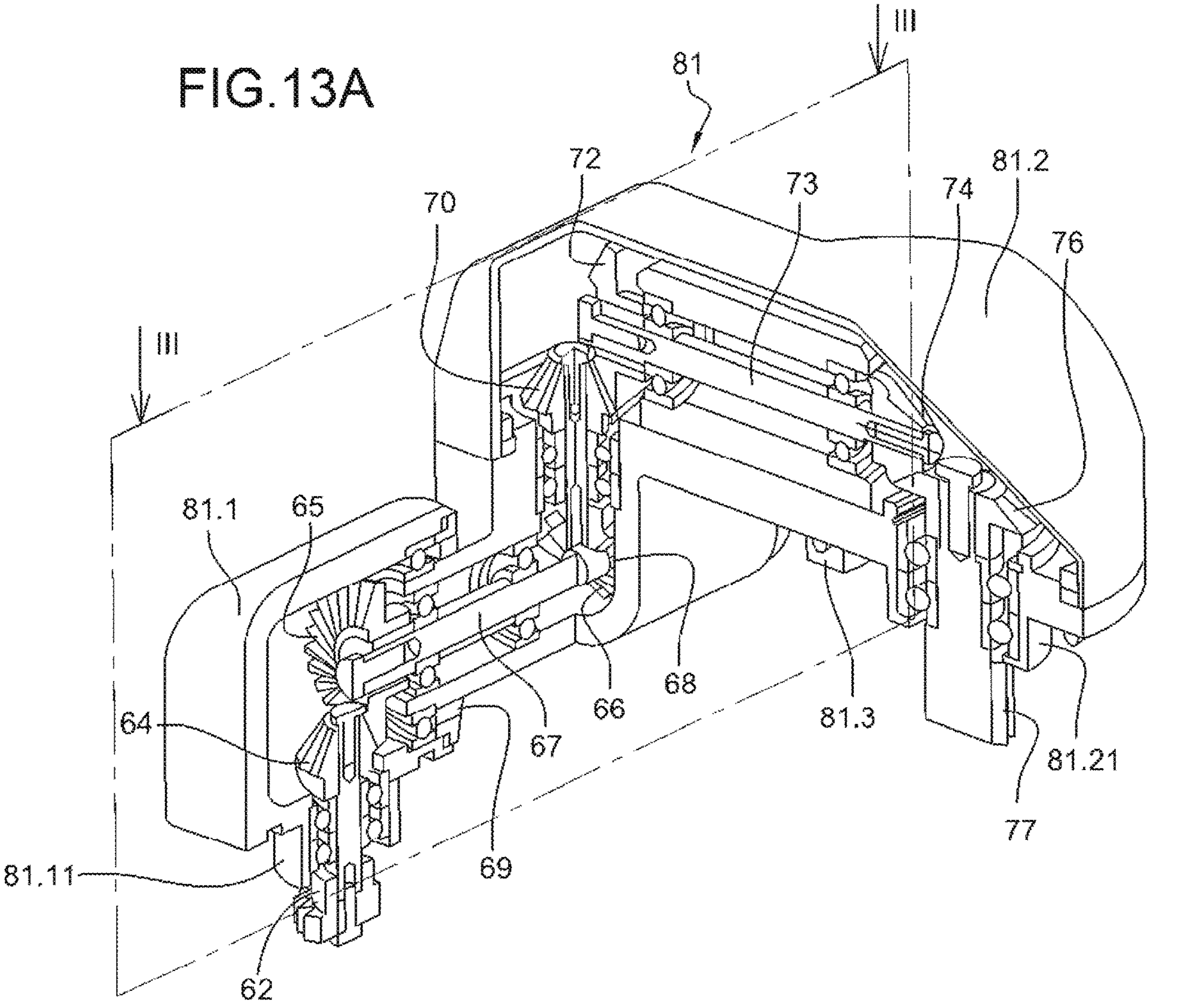
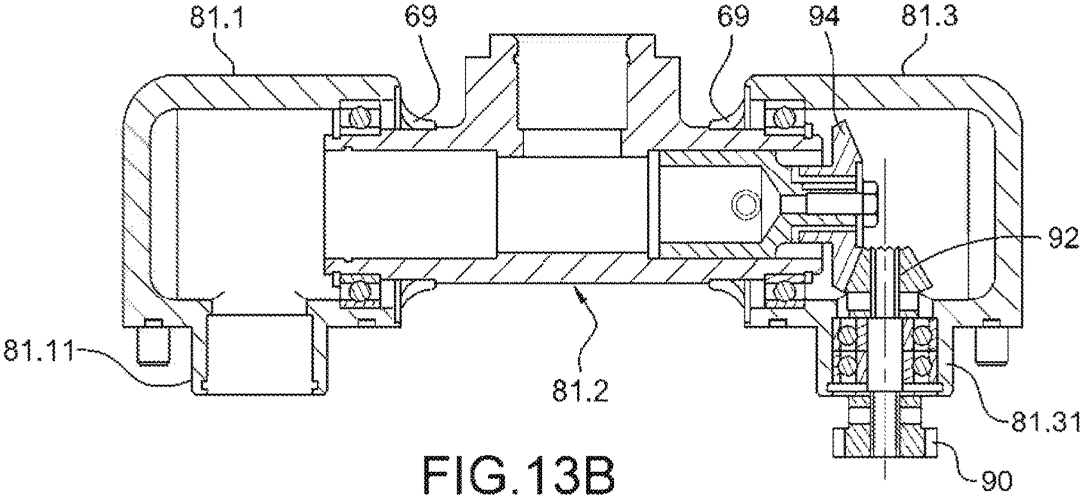
FIG.13B

SEALED CONNECTION DEVICE BETWEEN TWO ENCLOSED VOLUMES WITH IMPROVED SECURITY

This is the National Stage of PCT international application PCT/EP2020/060325, filed on Apr. 10, 2020 entitled "DEVICE FOR PROVIDING A FLUIDTIGHT CONNECTION BETWEEN TWO ENCLOSED VOLUMES HAVING ENHANCED SAFETY", which claims the priority of French Patent Application No. 1904029 filed Apr. 16, 2019, both of which are incorporated herein by reference in their entirety.

TECHNICAL FIELD AND PRIOR ART

The present invention relates to a sealed connection device between the two enclosed volumes providing improved connection security.

In a certain number of industrial sectors, among which the nuclear, medical, pharmaceutical and food sectors will be mentioned, it is necessary or desirable to perform certain tasks in a confined atmosphere, either in order to protect personnel, for example from radioactivity, toxicity . . . either on the contrary to be able to perform these tasks in an aseptic or dust-free atmosphere, or finally both simultaneously.

The transfer of apparatus or product from an enclosed volume to another, without at any time interrupting the sealing of each of these volumes from the outside, poses a delicate problem to be fulfilled. This problem can be solved by a double door connection device.

Such a double door device provided with a multiple security control is for example known from the document FR 3 010 118. Each volume is closed by a door mounted in a flange. Each door is secured to its flange by a bayonet connection and the two flanges are intended to be secured to one another by a bayonet connection.

In the case where one of the enclosed volumes is formed by a container and the other volume by a glove box or a cell, the transfer is carried out as follows. The container flange includes on its outer periphery lugs intended to cooperate with an indentation of the glove box flange. The flange of the container is introduced into the flange of the glove box, the container is oriented so as to match the lugs with the indentation.

the device includes means for securing the two flanges and a control ring mounted outside the first enclosed volume around the flange, the control ring controlling a plate for securing the two doors and unlocking the door of the second volume, means for releasing the other door and opening the two doors allowing sealed communication between the two volumes. The means for securing the two flanges and the control ring are movable in rotation relative to the enclosed volumes and, by their rotation, ensure all the steps required to obtain a sealed connection and without pivoting one of the enclosed volumes. No rotation of the second enclosed volume is required.

This device is satisfactory.

Seals are provided between the container and the cell. The inventors have detected that these seals exert a spring effect between the doors of the container and of the cell, which tended to pivot the securing plate and could cause a malfunction of the device.

DESCRIPTION OF THE INVENTION

Consequently, it is a purpose of the present invention to provide a sealed connection device between two enclosed volumes not having the above disadvantage.

The purpose of the present invention is achieved by a sealed connection device between a first and a second enclosed volume, each enclosed volume including an opening bordered by a flange and closed by a door, the door of the second enclosed volume being sealingly mounted in a flange by a bayonet connection, the device including means for securing the two flanges and a control ring mounted outside the first enclosed volume around the flange, the control ring controlling means for securing the two doors and for unlocking the door of the second volume, means for releasing the other door and opening the two doors allowing the sealed communication between the two volumes. The means for securing the two flanges and the control ring are movable in rotation relative to the enclosed volumes and, by their rotation, ensure all the steps required to obtain a sealed connection and without pivoting one of the enclosed volumes. Furthermore, the device includes means for immobilising in position the means for securing the two doors in a state of secured doors or in a state of disengaged doors.

These immobilisation means therefore avoid the malfunction stated above.

In a preferred example, the immobilisation means include a securing plate. The immobilisation means then ensure an angular holding of the plate in at least two given controlled states, a state of securing the doors and a state of non-securing the doors.

Very advantageously, the immobilisation means include a cam cooperating with a cam path having two ramps at each of the angular locking positions, allowing to assist the operator at the end of the stroke.

The profile of the ramps can be selected to provide a specific rendering to the operator in the case where the connection device is actuated manually, for example by means of a crank.

Then, the subject-matter of the present invention is an assembly including a first enclosed volume and a sealed connection device between the first enclosed volume and a second enclosed volume, the first enclosed volume including a first flange and a first door sealingly closing an opening delimited by the first flange, and the second enclosed volume including a second flange and a second door sealingly closing a second opening delimited by the second flange, the second door being secured to the second flange by a bayonet connection, said connection device being mounted on a wall of the first enclosed volume and comprising:

- first means for securing the first and second flanges to each other,
- second securing and disengaging means intended to sealingly secure the second door and the first door and to disengage the second door from the second flange, the second means including a securing plate mounted movable in rotation on an outer face of the first door about the longitudinal axis and capable of being secured to an outer face of the second door by a bayonet connection, said securing plate being such that a first part of the rotational displacement of the securing plate is intended to secure the first door and the second door and a second part of the rotational displacement of the securing plate is intended to unlock the second door relative to the second flange,
- third means for releasing the first door relative to the first flange,
- fourth means for opening a passage between the first and the second enclosed volume,
- a control ring capable of being rotated about a longitudinal axis, the rotation of said control ring actuating at least the second, third and fourth means, the assembly also including means for immobilising the securing plate relative to the first door in a first position in the absence of the second door and in a second position in the presence of the second door in a state wherein the first door and the second door are secured and the second door is unlocked relative to the second flange, a first device for actuating said control ring and a second device for actuating the first securing means.

In an exemplary embodiment, the immobilisation means include a cam and a cam follower, the cam being fixed to the first door and the cam follower being fixed to the securing plate or vice versa.

Preferably, the cam follower is fixed to a face of the securing plate opposite the first door.

In an advantageous example, the cam includes a cam path extending substantially along an arc of a circle and comprising at a first angular end, a first housing and at a second angular end a second housing, for housing and immobilising the cam follower in one of the first and second positions, and at least one first ramp in continuation of the first housing in the direction of the second housing, and a second ramp in continuation of the second housing in the direction of the first housing.

For example, the cam path includes a track with constant radius connecting the first ramp and the second ramp.

The cam follower may include a platen carrying a roller intended to circulate on the cam path and a fixed support relative to which the platen is configured to slide.

The first means advantageously include a securing ring mounted movable in rotation relative to the first flange about the longitudinal axis and include bayonet connection means for immobilising the second flange relative to the first flange. Preferably, a first part of the rotational displacement of the securing plate secures the first door and the second door and a second part of the rotational displacement of the securing plate unlocks the second door relative to the second flange.

For example, the second means include at least one pinion meshing with a toothed actuating sector carried by the control ring, a rotational displacement of the control ring causing a rotation of the securing plate.

The second means can advantageously include a gear train coupled to the securing plate to rotate it, said gear train being driven by said pinion. The second means may include a pinion with straight teeth meshing with the first toothed sector and a bevel gear.

The assembly advantageously includes means for locking the first door and the second door to each other when they are spaced from the first and second flanges. For example, the locking means include a finger movably mounted in the securing plate, said finger being able to be retracted in the securing plate when the second door is disposed against the first door and capable of protruding from the securing disc when the securing disc secures the first and the second door, the finger blocking the rotation of the second door relative to the first door with a stop.

Advantageously, the finger includes a roller and the locking means include a cam carried by an outer face of the first door ensuring the return to the retracted position of the finger in the securing disc in the phase of separation of the first and second enclosed volumes.

In an exemplary embodiment, the first actuator device also forms the second actuation device, and includes for example a crank disposed outside the first enclosed volume.

According to an additional feature, the first door is articulated relative to the first flange around a hinge of axis orthogonal to the longitudinal axis and the fourth means include at least one pinion meshing with another toothed sector for actuating the control ring, said pinion being coupled to said hinge, the rotational displacement of the control ring causing rotation of the first door about the hinge.

The control ring may include a toothed sector for driving with a pinion the second actuation means.

BRIEF DESCRIPTION OF THE DRAWINGS

The present invention will be better understood using the description which follows and the appended drawings, wherein:

FIG. 13A is a partially cut isometric perspective view of a cowling shown in isolation from the connection device, FIG. 13B is a view partially representing the section along plane III-III of FIG. 13A.

DETAILED DESCRIPTION OF PARTICULAR EMBODIMENTS

The terms "upstream" and "downstream" are considered in the direction of the setting into place of the container in the connection device.

In the embodiment shown in the figures, the two closed spaces that are to be connected using a double door sealed connection device provided with the actuating mechanism in accordance with the invention correspond respectively to a confinement cell 10 and to a container 12. It is understood however that the invention also applies in the case where the closed spaces would for example be for one a glove box and for the other a container or two glove boxes.

Figure 12:
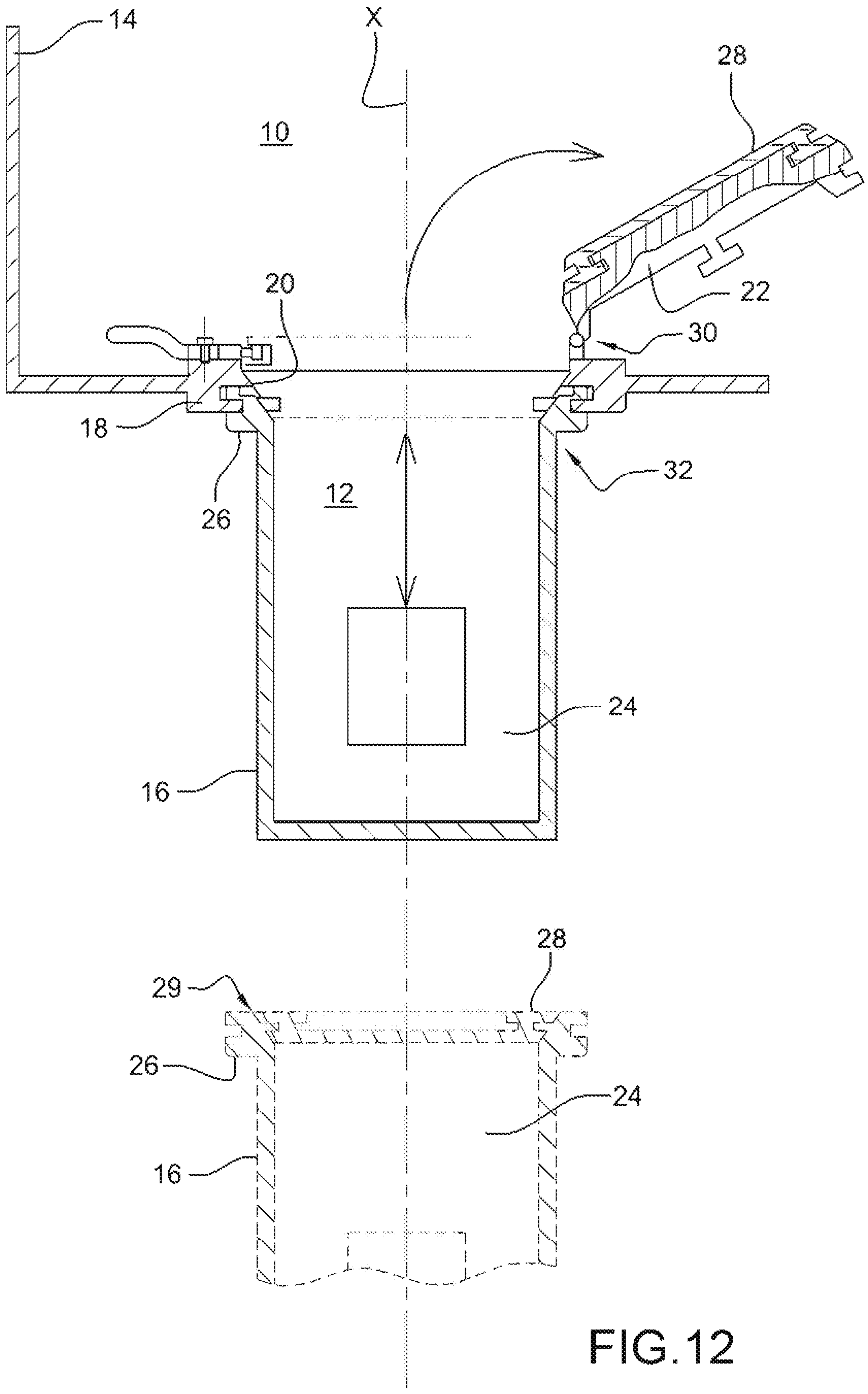
FIG. 12 is a view in longitudinal section schematically illustrating the coupling of a container to a cell by means of a sealed double door connection device.
Figure 14A:
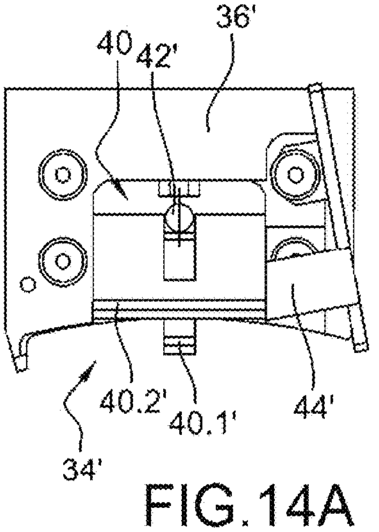
FIG. 14A is a top view of another embodiment of the axial snap-fitting securing means.
Figure 14B:
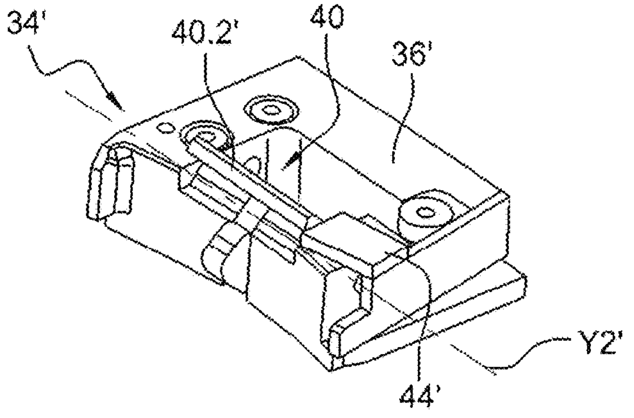
FIG. 14B is a perspective view of the securing means of FIG. 14A.
Figure 14C:
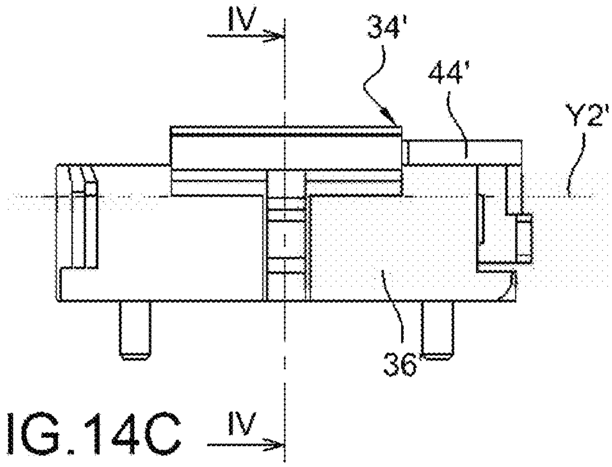
FIG. 14C is a front view of the securing means of FIG. 14A in the unlocked state.
Figure 14D:
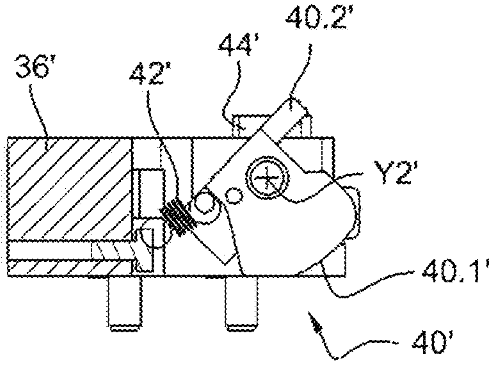
FIG. 14D is a sectional view of FIG. 14C along the plane IV-IV.
Figure 14E:
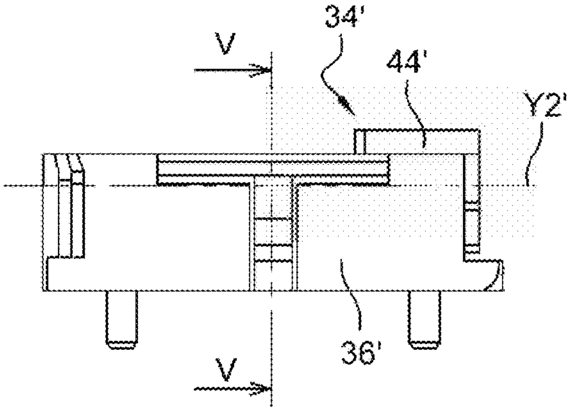
FIG. 14E is a front view of the securing means of FIG. 14A, the container being in place but not being shown.
Figure 14F:
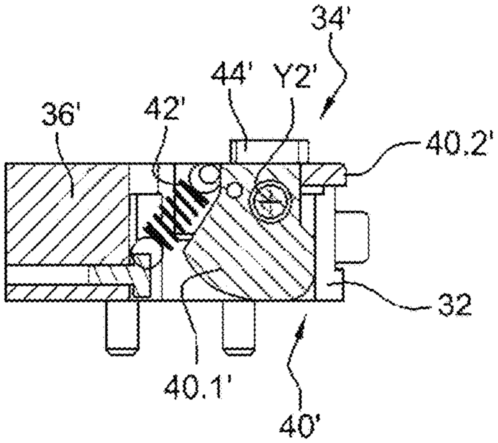
FIG. 14F is a sectional view of FIG. 14E along the plane V-V.

FIG. 12 diagrammatically shows the cell 10 and the container 12 in a connected state and in a disconnected state.

The cell 10 is delimited by a wall 14 of which only a portion can be seen in FIG. 12. It is provided, conventionally, with means for remote manipulation such as remote handling devices and/or gloves (not shown) secured to the wall 14. The container 12 is also delimited by a wall 16, as shown in particular in FIG. 12.

The cell comprises a cell flange 18 mounted in a sealed manner in a wall 14 of the cell and delimiting an opening 20 that is closed off in a sealed manner by a removable door 22, referred to as a cell door or door.

The container comprises a reservoir 24 and a container flange 26 that is closed off in a sealed manner by a removable door 28. For the purposes of clarity, the container door 28 shall be designated as "container cover" or "cover" in order to clearly distinguish it from the cell door. The reservoir 24, the container flange 26 and the cover 28 delimit a sealed space. The cover 28 is secured to the container flange by a bayonet connection 29.

The device for the sealed connection comprises the cell flange 18, the container flange 26, the cell door 22 and the container cover 28. The cell door 22 is articulated on the cell flange 18 by a hinge 30 with axis Y orthogonal to the longitudinal axis X.

The axial direction corresponds to the axis of the cell flange 18 and of the door 22, as well as that of the container flange 26 and of the cover 28 when the latter are secured to the cell. The axial direction is represented by the axis X which is the axis of the connection device.

FIGS. 1 to 11 show in detail an embodiment of a device for the sealed connection according to the invention. The connection device is mounted on the wall of the cell around the opening 20. The connection device is mobile in relation to the wall of the cell 14.

The connection device comprises first means A of securing the container flange 26 onto the cell flange 18.

In the example shown, the container flange 26 comprises four lugs 32 arranged at 90° from each other radially protruding towards the exterior of the container flange 26. The container flange 26 could comprise two lugs, three lugs or more than four lugs, furthermore the angular arrangement is not restrictive.

The first means A comprise a securing ring 100 mounted coaxial to the cell flange 18 onto the outer surface of the latter and able to pivot in relation to it around the longitudinal axis X.

In the example shown, the securing ring 100 comprises four imprints 102 intended to each receive a lug 32 of the container flange 26. The rotation of the securing ring 100 in the anti-clockwise direction provides a securing by bayonet connection between the container flange 26 and the securing ring 100 and therefore between the container flange 26 and the cell flange 18. The imprints 102 have a first portion extending axially 102.1 that allows for the inserting and the removing of the lugs 32 according to an axial direction and a second portion 102.2 extending laterally in relation to the axial portion in a downstream zone. The second portion 102.2 receives the lugs 32 when the securing ring 100 has pivoted, which provides an axial maintaining of the lugs 32 and therefore of the container flange 28 in relation to the cell flange 18.

In the example shown, the securing ring 100 is mounted mobile in relation on the cell flange 18 by means of four rollers 106. It is understood that the number of rollers is not restrictive.

Advantageously, sensors are provided in order to know the various states of the system: door closed, door open, door opening or closing, etc., for example by detecting the displacement and/or the position of the securing ring, more particularly in a motorised embodiment and in an embodiment wherein the operator would not be in a position to visually identify in what state the system is in.

The actuating mechanism comprises an actuating device 108 of the securing ring 100 in rotation around the longitudinal axis X.

The actuating device 108 is arranged advantageously outside of the cell in such a way as to be able to be activated by the operator from the exterior. In the example shown this actuating device 108 comprises a crank 110. Any other mechanical actuating device can be considered. According to a variant, it could be provided to motorise the actuating of the securing ring 100. The motorised means could also be located inside the cell.

The securing ring 100 comprises a radially exterior sector gear 112 which is engaged by a pinion 114 of the actuating device 108. This actuating device is simple and robust. Other means for transmitting the movement between the actuating means and the securing ring could be provided.

Very advantageously, the device for the sealed connection comprises a system for the axial maintaining of the container against the wall of the cell.

Preferably, this system for maintaining comprises at least one device for the axial maintaining with snap-fitting 34 intended to axially maintain the container flange 26 in relation to the cell flange 18, such as shown in the FIGS. 1 to 4E and 5.

This device for maintaining, designated in what follows as snap-fitting device, is intended to be implemented prior to the securing of the two flanges 18, 26 by the securing ring 100. For example, the device is particularly advantageous in providing for the maintaining of the container on the wall 14 of the cell when the container is intended to be positioned horizontally for example for the transfer. This snap-fitting device then makes the assembly of the container on the cell easier for the operator since he no longer has to maintain for example at the end of his arm the container until the container flange 26 is secured to the cell flange 18 by the securing ring 100.

In the example shown, the connection device comprises a snap-fitting device on two lugs 32 diametrically opposite the container flange 26. The snap-fitting devices 34 are located in a diametrically opposite manner on the cell flange 18.

In the FIGS. 3, 4A to 4E, an embodiment of a snap-fitting device 34 can be seen in more detail.

As the two snap-fitting devices are similar, only one of the two devices shall be described. The snap-fitting device 34 comprises a base 36 fastened onto the cell flange 18 at the periphery of the opening 20, an actuating connecting rod 38 articulated in rotation on the base 36 around an axis Y1 perpendicular to the axial direction and to the diametrical direction of the cell flange 18.

The snap-fitting device 34 also comprises a locking connecting rod 40 articulated in rotation on the base 36 around an axis Y2 parallel to the axis Y1, and a return means 42 restoring the locking connecting rod 40 to an unlocked position. The return means 42 is fastened to the base and to the locking connecting rod 40. The actuating connecting rod 38 and the locking connecting rod 40 are in contact by one of their ends 38.1, 40.1 respectively, in such a way that a pivoting of the actuating connecting rod 38 in the clockwise direction causes a rotation of the locking connecting rod 40 in the clockwise direction. The ends 38.2, 40.2 of the connecting rods are located on the side of the opening 20.

The snap-fitting device 34 also comprises means for locking in order to block the locking connecting rod 40 in a locked state. The locking means comprise a finger 44 articulated in rotation on the base 36 around an axis perpendicular to the axes Y1 and Y2 in such a way that an end of the finger 44 can move closer to and move away from the locking connecting rod 40. An elastic return means, such as a spring (not visible) pushes the finger 44 in the direction of the connecting rod. According to a variant, the finger 44 can be formed from a blade which is deformed elastically in flexion and integrating the elastic return means.

Figure 4A:
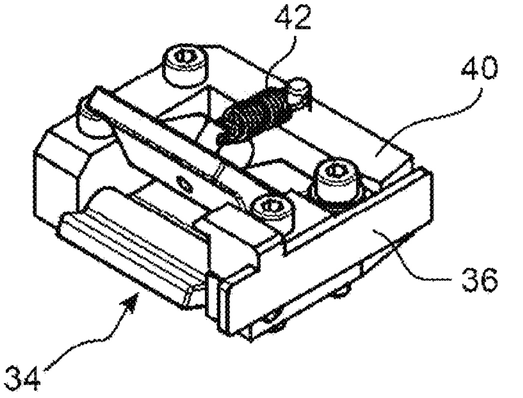
FIG. 4A is a perspective view of the axial snap-fitting securing means of FIG. 3.
Figure 4B:
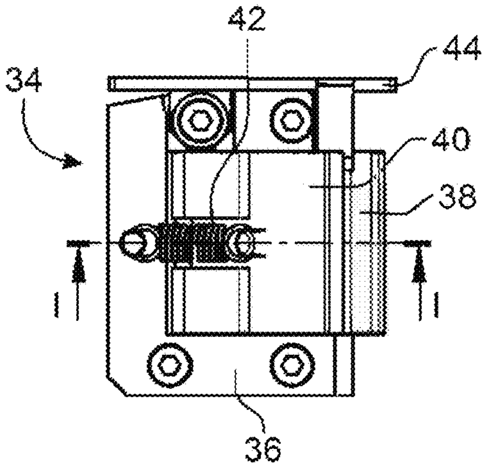
FIG. 4B is a top view of the securing means of FIG. 4A.
Figure 4C:
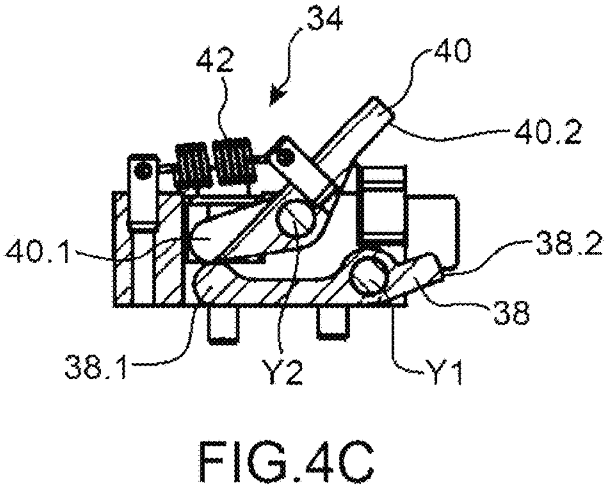
FIG. 4C is a sectional view of FIG. 4B along the plane I-I.
Figure 4D:
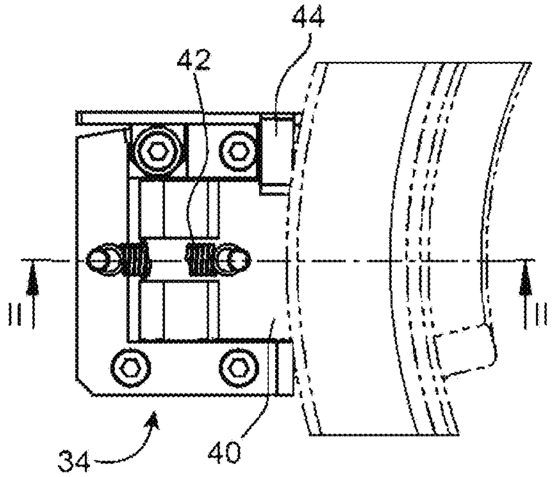
FIG. 4D is a top view of the securing means of FIG. 4A, the container being in place.
Figure 4E:
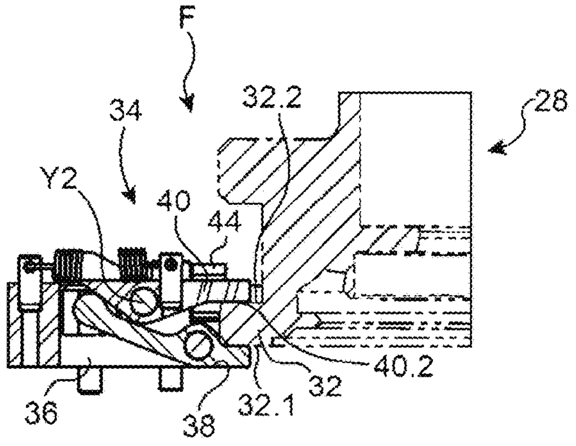
FIG. 4E is a sectional view of FIG. 4D along the plane II-II.
Figure 5:
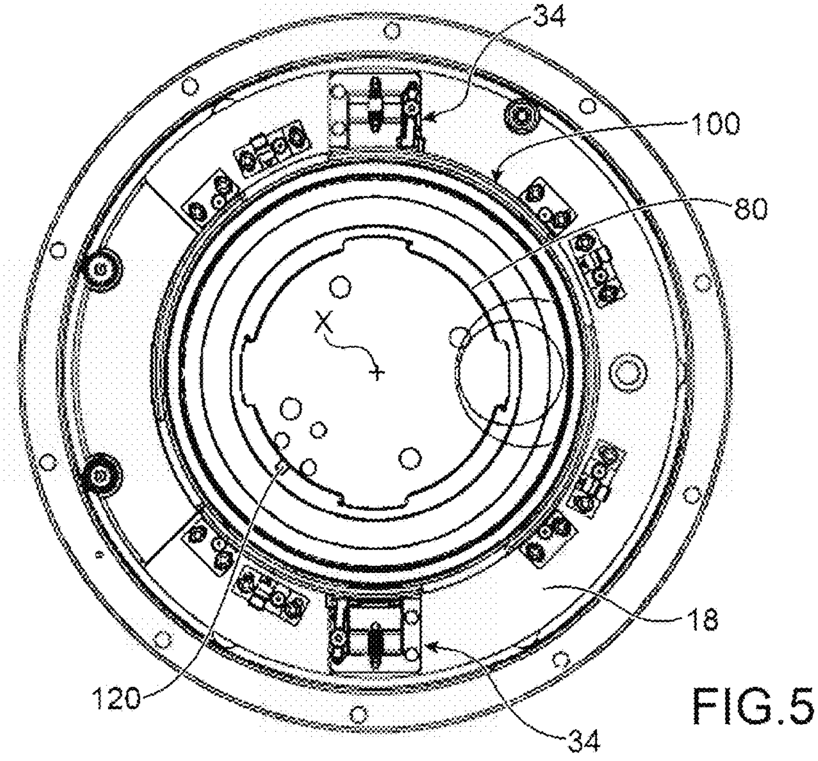
FIG. 5 is a front view of the cell flange and the cell door and the sealed connection device according to the invention, the control ring and the actuation means having been omitted.

The operation of the snap-fitting device is as follows and is shown in FIGS. 4D and 4E. A lug 32 of the container flange 28 is brought closer according to the direction of the arrow F towards the snap-fitting device, until it bears via a first transverse surface against the actuating connecting rod 38. Under the effort applied by the lug 32 towards the cell 14, the actuating connecting rod 38 pivots around its axis Y1 in the clockwise direction, causing the rotation in the clockwise direction of the locking connecting rod 40 around its axis Y2. The locking connecting rod 40 then comes to bear by its other end 40.2 against a second transverse surface 32.2 of the lug 32 opposite the first transverse surface 32.1. The lug 32 is then axially maintained against the cell flange 18. Moreover, the pivoting of the locking connecting rod 40 in the clockwise direction is such that the finger 44 passes over the end 40.2 of the locking connecting rod 40 locking it by bearing against the lug 32. The finger 44 is pivoted in such a way as to separate the end 40.2 of the locking connecting rod 40 in order to release the latter. This releasing takes place when it is desired to detach the container from the cell flange. The pivoting of the finger 44 can be obtained by means of an actuator (not shown) or by a slight rotation of the container.

Another very advantageous embodiment of a snap-fitting device 34' can be seen in FIGS. 14A to 14F, this device differs from device 34 in that it uses a locking cam. The number of moving parts is reduces, reliability of the device is then increased and the manufacturing is easier.

The snap-fitting device 34' comprises a base 36' fastened onto the cell flange 18 at the periphery of the opening 20, an locking cam 40' articulated in rotation on the base 36 around an axis Y2' perpendicular to the axial direction and to the diametrical direction of the cell flange 18, and a return means 42 restoring the locking cam 40' to an unlocked position. The return means 42 is fastened to the base and to the locking cam 40'.

The locking cam 40' comprises on its face which is oriented towards the longitudinal axis of the device a downstream area 40.1' in the direction of insertion of the flange in the snap-fitting device, which forms an actuating area, and an upstream area 40.1 which forms an abutment.

The actuating area 40.1' forms a cam surface which protrudes towards the inside of the device in an unlocking position, in such manner that, when the container flange is brought closer towards the snap-fitting device, one of the lugs 32 bears against the cam surface 40.1', resulting in its rotation, the abutment area 40.1' then faces the rear face of the lug, more preferably bears against the rear face of the lug, preventing the withdrawal of the lug.

The snap-fitting device 34' also comprises means for locking in order to block the locking cam 40" in a locked state. The locking means comprise a finger 44' articulated in rotation on the base 36' around an axis perpendicular to the axe Y2' in such a way that an end of the finger 44' can move closer to and move away from the locking connecting rod 40'. An elastic return means, such as a spring (not visible) pushes the finger 44' in the direction of the connecting rod. According to a variant, the finger 44' can be formed from a blade which is deformed elastically in flexion and integrating the elastic return means.

The operation of the snap-fitting device is as follows and is shown in FIGS. 14C to 14F.

A lug 32 of the container flange 28 is brought closer according to the direction of the arrow F towards the snap-fitting device, until it bears via a first transverse surface against the cam surface 40.1'. Under the effort applied by the lug 32 towards the cell 14, the locking cam 40' pivots around its axis Y2' in the clockwise direction. The abutment area 40.2' bears against the rear face of the lug 32 The lug 32 is then axially maintained against the cell flange 18. Moreover, the pivoting of the locking cam 40' in the clockwise direction is such that the finger 44' passes over the abutment area 40.2' locking it by bearing against the lug 32. To release the locking cam 40', finger 44 is separated from the abutment area. This releasing takes place when it is desired to detach the container from the cell flange. The pivoting of the finger 44' can be obtained by means of an actuator (not shown) or by a slight rotation of the container.

In the example shown, two devices for the axial maintaining by snap-fitting are provided.

In an advantageous variant, a single device for the axial maintaining by snap-fitting can be provided and in place of the second snap-fitting device a base comprising a groove in the shape of an arc of circle that opens radially towards the longitudinal axis X able to house a lug 32 and to maintain it axially. A lug is then engaged in the groove, providing its axial maintaining, then the other lug 32 is engaged in the snap-fitting device.

According to a variant, the system for the axial maintaining could implement magnetic means, the cell flange 18 and the container flange 26 would then be maintained by magnetisation.

More preferably, in the case of a vertical cell wall, the device for the axial maintaining by snap-fitting is located in the lower zone of the cell flange and the base provided with the groove is located in the upper zone of the cell flange.

According to a variant, a system with more than two devices for the maintaining by snap-fitting can be considered.

Particularly advantageously, the snap-fitting device or devices cooperate with the securing ring 100.

Figure 1:
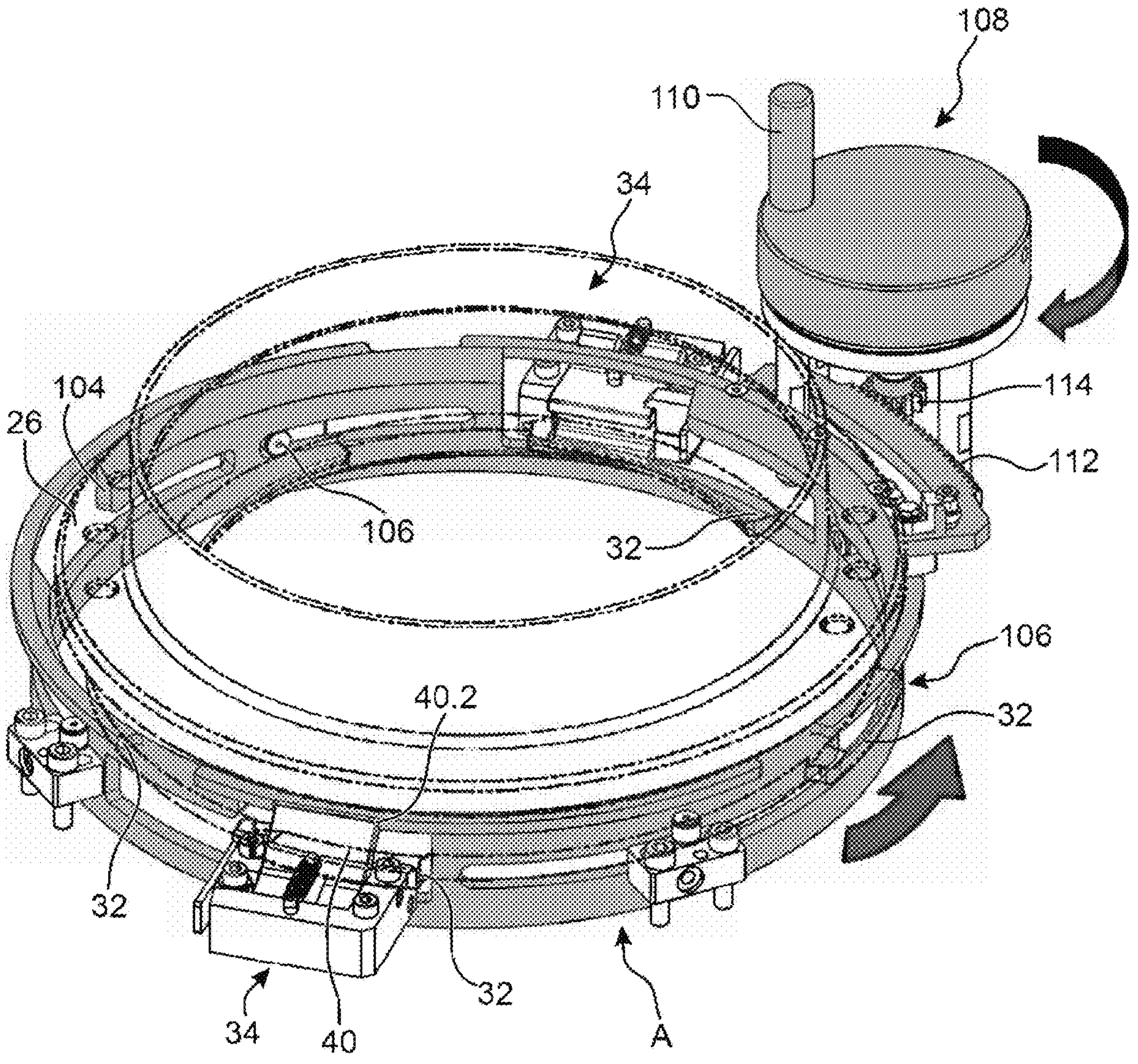
FIG. 1 is a partial perspective view of an exemplary embodiment of a connection device between a cell and a container, the container being shown in transparency.
Figure 3:
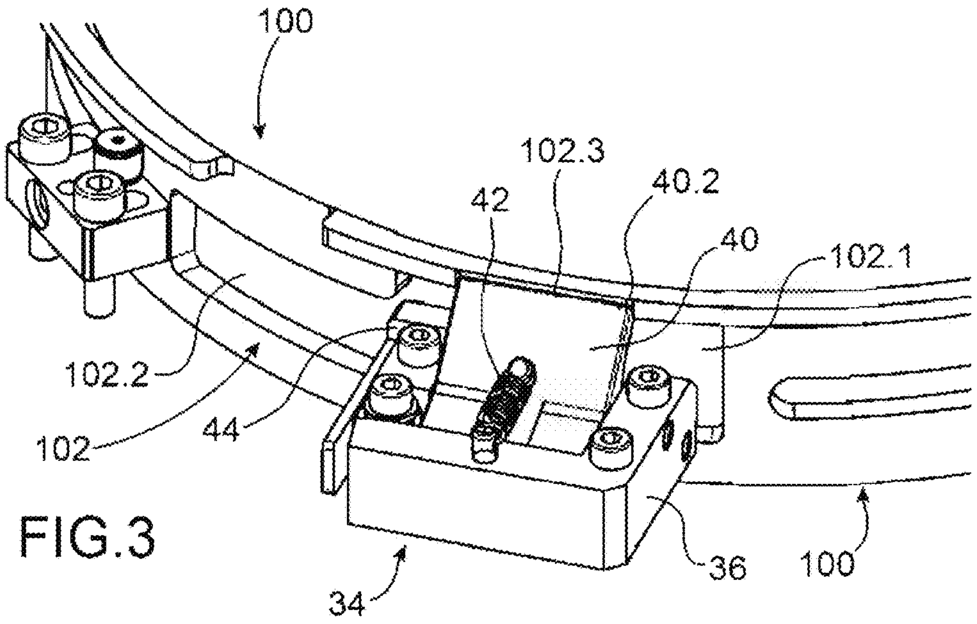
FIG. 3 is a detailed perspective view of the means for axially securing by snap-fitting the container flange and the cell flange of the sealed connection device.

As is shown in FIGS. 1 and 3, the snap-fitting devices are located downstream of two imprints radially opposite the securing ring 100, in the direction of insertion of the lugs 32 into the securing ring 100.

As such, after the lugs 32 have been introduced into the imprints 102, they engage the actuating connecting rods 38 which causes the tipping of the locking connecting rods, maintaining the lugs axially.

In the absence of the container flange, the end 40.2 of the locking connecting rod 40 is located in the upper zone of the first portion 102.1 of the window 102 when no container is in place and penetrates into a notch 102.3 made in the first portion 102. The locking connecting rods 40 thus also provide a locking in rotation of the securing ring 100 in the absence of a container. As such, any manipulation of the ring 100 in the absence of the container is avoided.

In this particularly advantageous embodiment, the container flange 26 is maintained axially by the snap-fitting device or devices 34 and then the cell flange 18 and the container flange 26 are secured by the securing ring 100.

The snap-fitting maintaining devices are very advantageous in particular when the cell wall is in a vertical or inclined plane, as such when the container is maintained by the means 34, the operator can easily actuate the first means A.

The device for the sealed connection also comprises second means B intended to secure the container cover 28 and the cell door 22 and to unlock the cover.

The connection device also comprises third means C in order to release the cell door from the cell flange, and fourth means D for releasing the passage between the inside of the container and the inside of the cell.

The device for the sealed connection advantageously has a common actuating system of the second and third means.

The common actuating system is formed by a control ring 48 mounted in rotation on the cell flange 18 around the axial direction and arranged outside of the cell in the example shown. In the example shown, the control ring 48 is a ring gear of which the teeth are oriented radially outwards from the control ring 48. The common actuating system comprises a device for actuating intended to place in rotation the control ring 48 around the longitudinal axis X. Very advantageously, the device for actuating is formed by the device for actuating 108 of the securing ring 100, which makes it possible to simplify the structure and reduce is cost price. According to a variant, a separate device for actuating can be provided.

Figure 2:
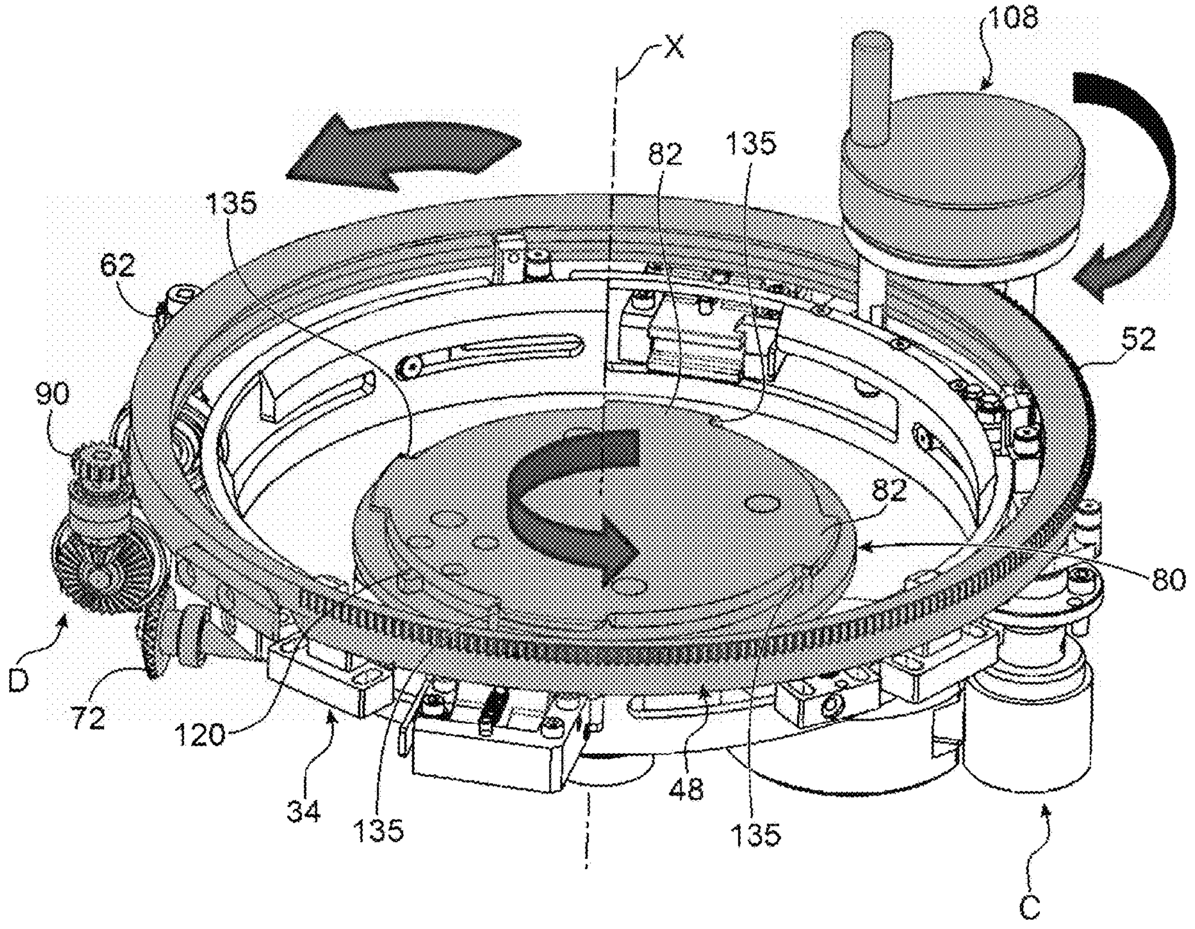
FIG. 2 is a perspective view of the sealed connection device seen from the outside of the cell.

FIG. 2 shows the ring gear 48. The latter is mounted upstream of the securing ring 100 in the direction of the setting into place of the container and has an inner diameter that is greater than the outer diameter of the securing ring 100 in order to allow for the penetration of the container flange 28 into the securing ring 100.

Figure 6A:
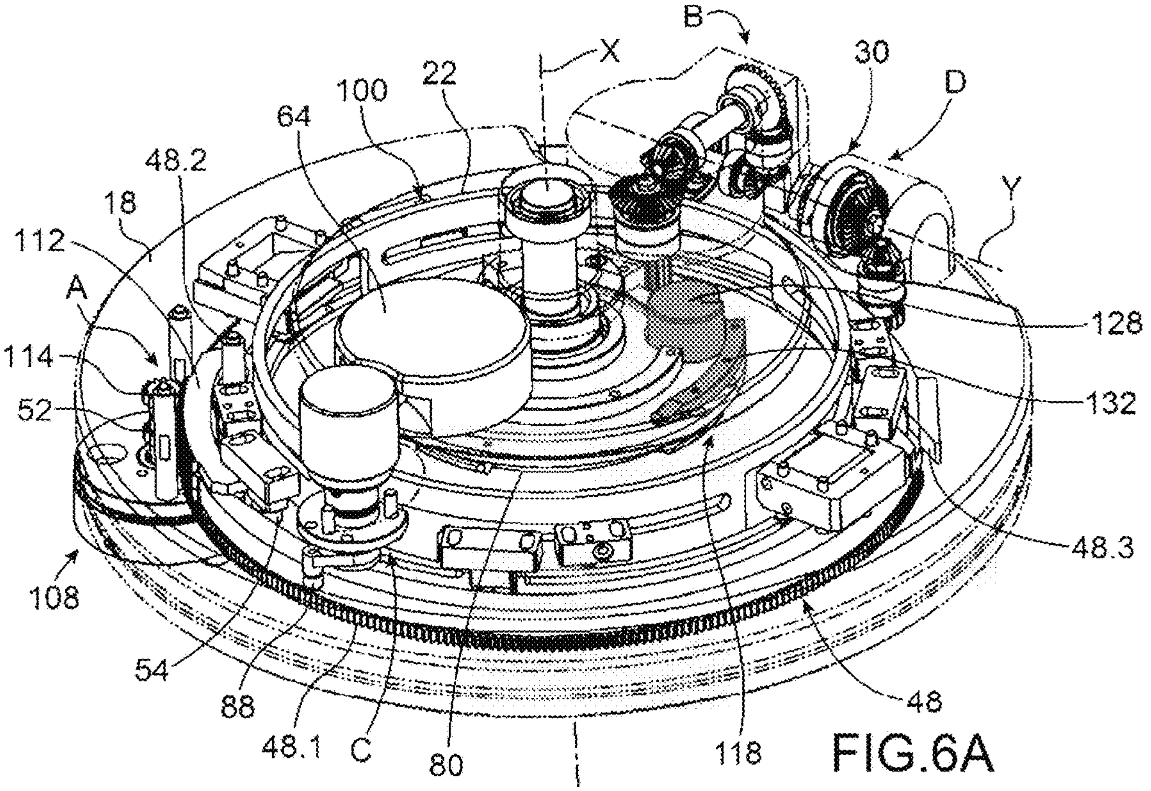
FIG. 6A is a perspective view of the sealed connection device seen from inside the cell, some elements being shown in transparency in the absence of the container door.

In FIG. 6A, the securing ring 100 can be seen, the toothed sector 112 of which is meshed by the pinion 114 and the toothed ring 48 is meshed by a pinion 52 coaxial with the pinion 114.

The control ring 48 includes a drive toothing 48.1 meshed by the pinion 52 which ensures its rotation and toothed sectors intended to actuate the various means of the connection device. In the example shown, the toothed sector 48.1 extends over only a part of the control ring 48 periphery, the angle over which the drive sector extends is determined to allow actuation of the different means B, C, D. Alternatively, a drive sector could cover the entire periphery of the control ring 100.

The control ring 48 is advantageously held axially and radially by rollers 54 which allow the rotation of the toothed ring 48 about the axial direction while limiting friction.

The second B, third C and fourth D means are disposed on the periphery of the toothed ring 48 and are actuated successively by rotating the ring.

The second securing means B of the cell door 22 and of the container 28 cover include an inter-door securing plate designated 80.

The inter-door securing plate 80 is rotatably mounted on the cell door 22. The locking of the cell door 22 and of the container cover 28 is obtained by a bayonet connection. In the example shown, the securing plate 80 has four lugs 82 protruding radially outwards and the cover 28 includes a hollow indentation provided with four radially external notches for receiving the lugs of the securing plate 80 and a peripheral groove connecting the notches. A relative rotation of the securing plate 80 and the cover 28 ensures an at least partial masking of the lugs of the securing plate 80 forming an axial stop for the lugs 82 and an axial securing of the securing plate and the cover 28.

Figure 10:
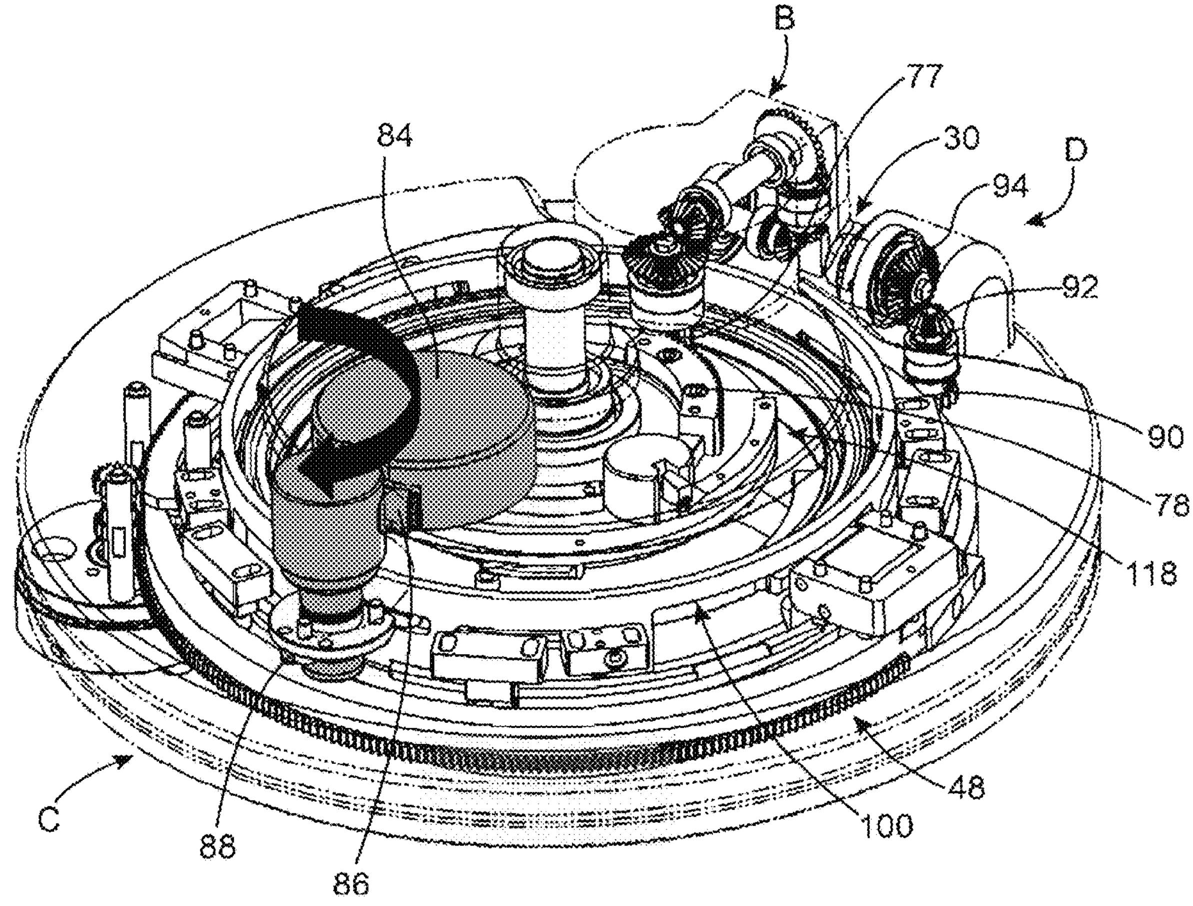
FIG. 10 is a perspective view of the sealed connection device seen from inside the cell, some elements being shown in transparency in an unlocking position of the cell door relative to the cell flange.

The securing plate 80 is rotated by the actuation of the control ring 48. In the example shown, the second means B, more particularly visible in FIG. 13A, include a pinion 62 with straight teeth meshed by a first toothed actuating sector 48.2 of the control ring 48, a bevel pinion 64 secured in rotation with the pinion 62. In the example shown, they are located at both ends of the same axis. The bevel pinion 64 meshes with a bevel pinion 65 which forms the entrance to a chain of gears, the gears being designated 66, 68, 70, 72, 74, 76, 77. The gear 77 meshes with a toothed sector or a rack 78 secured in rotation to the inter-door securing plate 80 as can be seen in FIG. 10.

The assembly formed by the pinions 62, 64 and the gear chain allows reducing the rotation torque of the handle and facilitating the handling by the operator.

In FIGS. 13A and 13B, the chain of gears allowing to rotate the securing plate 80 can be seen alone. The gear chain is received in a cowling 81 also visible in FIGS. 6A, 6B, 7A, 8A and 10, ensuring the sealed crossing between the outside and the interior of the cell. In the example shown, the cowling includes three parts 81.1, 81.2, 81.3 sealingly articulated relative to each other by means of seals 69.

The parts 81.1 and 81.3, designated blocks, are identical. The part 81.2 disposed between the parts 81.1 and 81.3 is called “arm”.

The articulation between the two blocks 81.1, 81.3 and the arm 81.2 allows opening the cell door 22. The rotation is ensured by rolling elements. Alternatively bearings could be implemented.

The block 81.1 receives a part of the gear chain controlling the inter-door plate 80. The block 81.3 receives the opening means D.

In the example shown, the block 81.1 includes a sleeve 81.11 surrounding the axis connecting the pinions 62 and 64.

The block 81.3 also includes a sleeve 81.31 (FIG. 13B).

The arm 81.2 surrounds the axis connecting the pinions 76 and 77. The sleeves 81.11 and 81.21 sealingly pass through the cell flange and the door 22 respectively, static seals are interposed between the sleeves 81.11, 81.31 and the cell flange 18 and between the sleeve 81.21 and the cell door 22.

Alternatively and in particular in the case of a small diameter device for which the forces are less, it can be considered that the cowling only includes one block and one arm, the opening means D then being combined with the securing means B in this case, provision can be made for the block to be made integrally with the flange, which eliminates the need for seals to provide the sealing between the block and the flange.

The gear chain includes two larger axes 67, 73 between the pinions 65 and 66 and between the gears 72 and 74 respectively. Alternatively, these axes with their gears could be replaced by chain sprockets or by pulleys with a system of belts or chains.

A first phase of the rotation of the inter-door securing plate 80 ensures axially locking the door 22 and the cover 28 and a second phase of rotation of the securing plate 80 rotates the cover 28 relative to the container flange 26 and ensures unlocking the cover 28 relative to the container flange 26.

In a particularly advantageous manner, the mechanism includes locking means 118 preventing the cell door 22 and the cover 28 to be disengaged to each other when the passage between the interior of the container and the interior of the cell is open, i.e. when the door and cover assembly is in the position detached from the cell and container flanges.

Figure 7A:
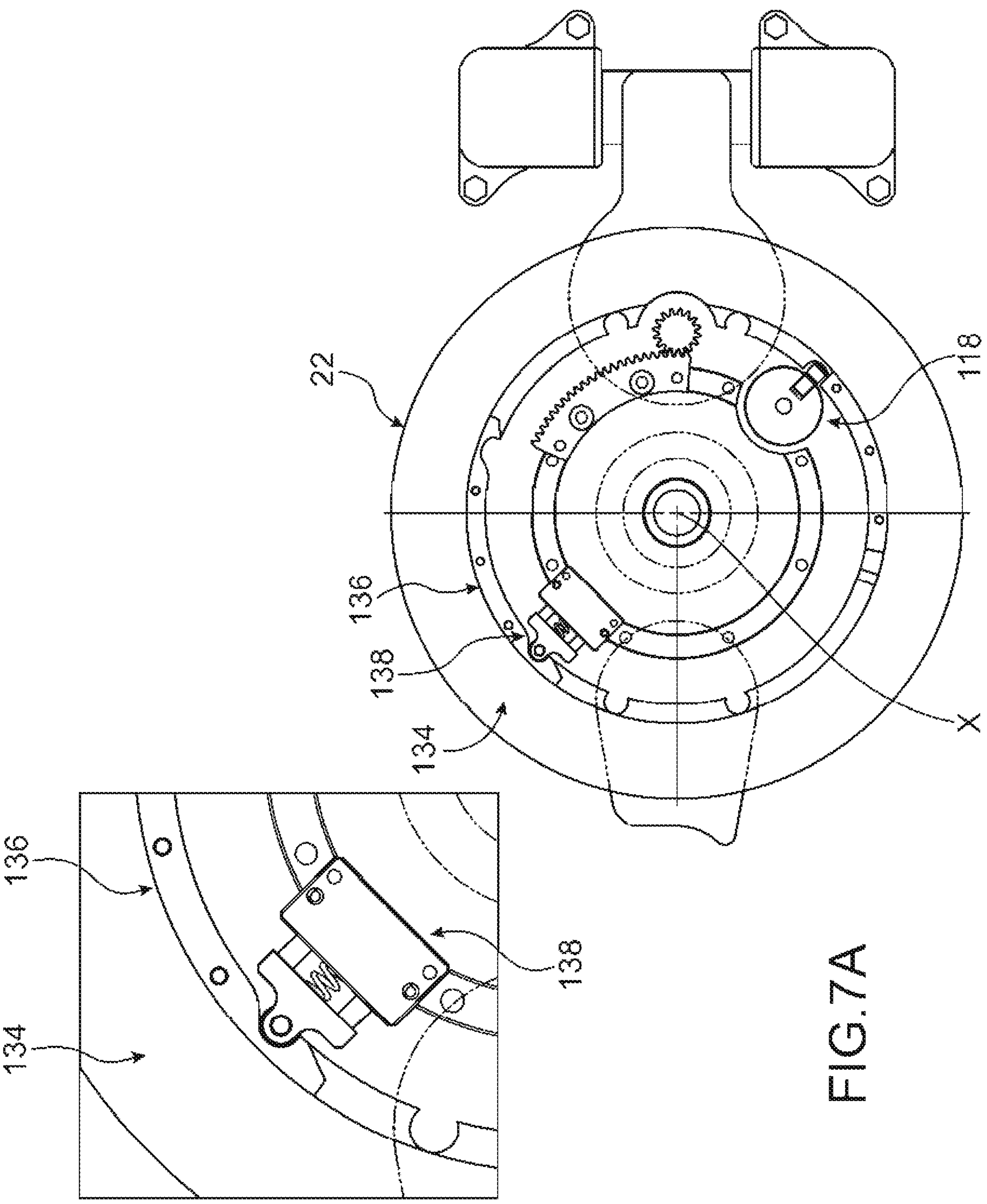
FIG. 7A is a view of the connection device and a detail view from the cell in the absence of the container door.
Figure 7B:
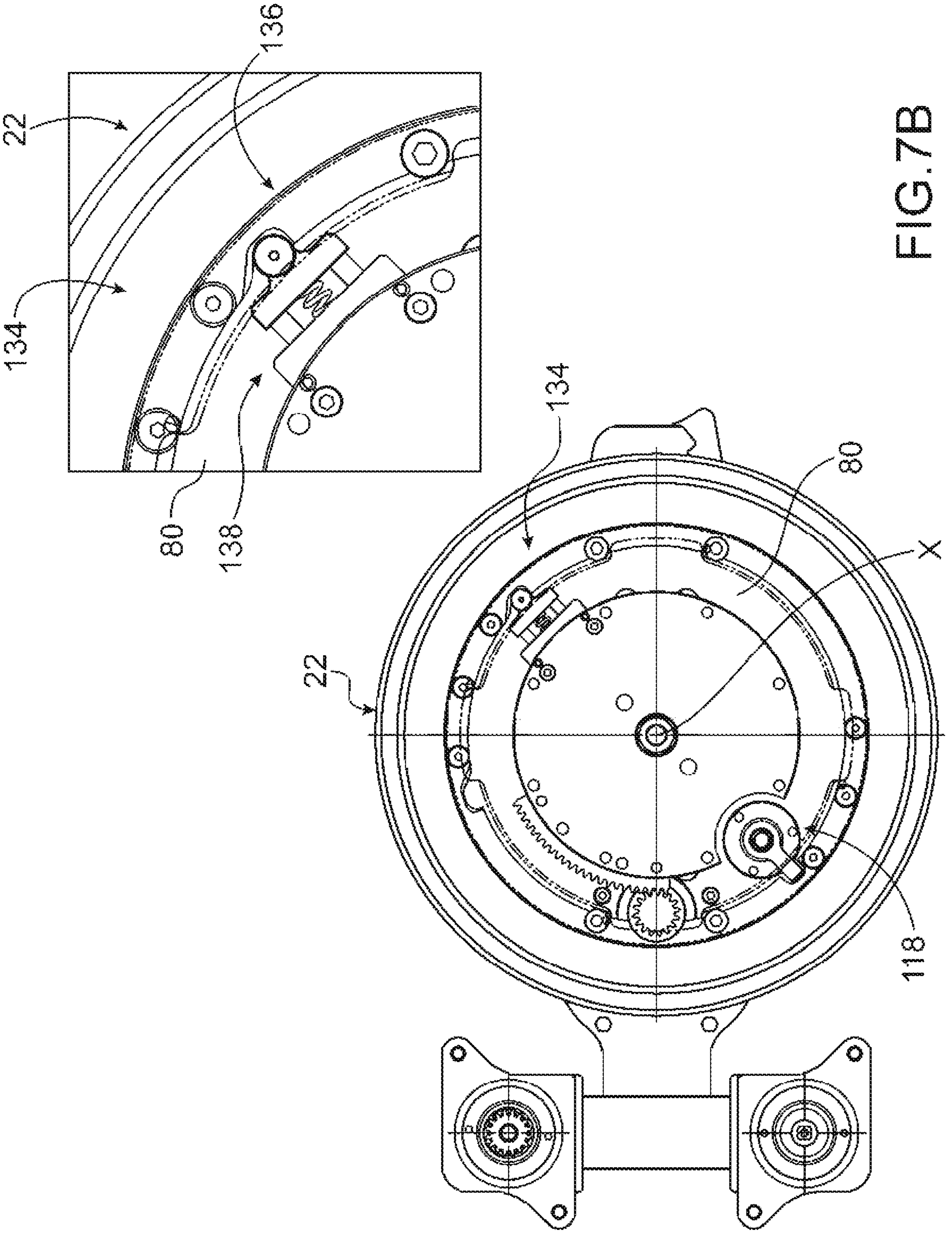
FIG. 7B is a view of the connection device and a detailed view from the container of FIG. 7A.
Figure 7C:
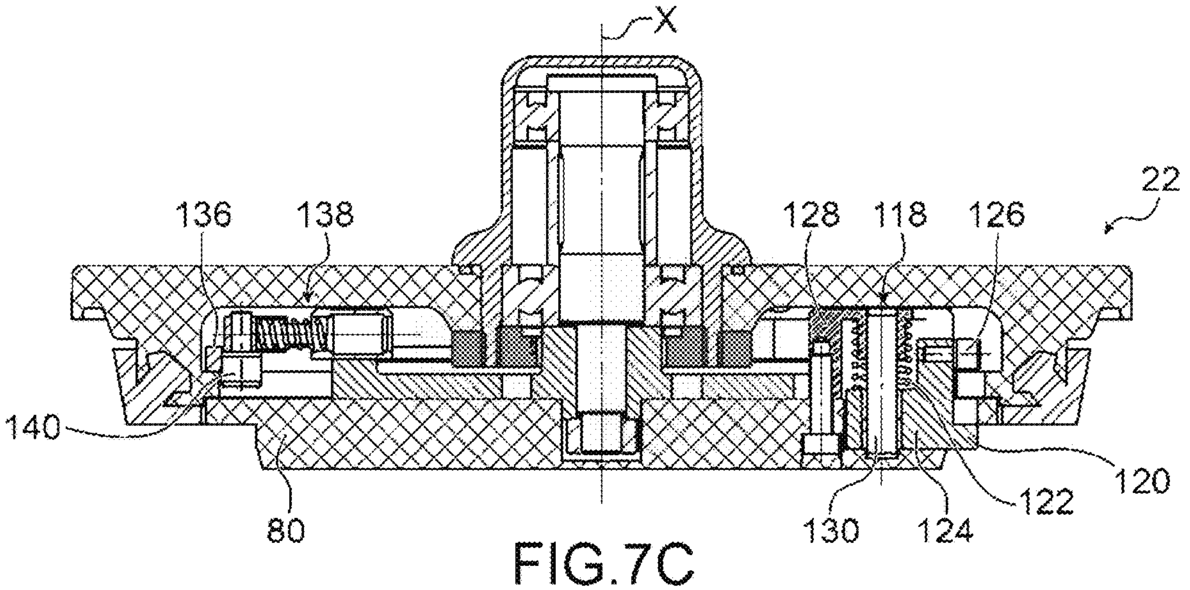
FIG. 7C is a view in longitudinal section of the connection device of the position of FIG. 7A.
Figure 8A:
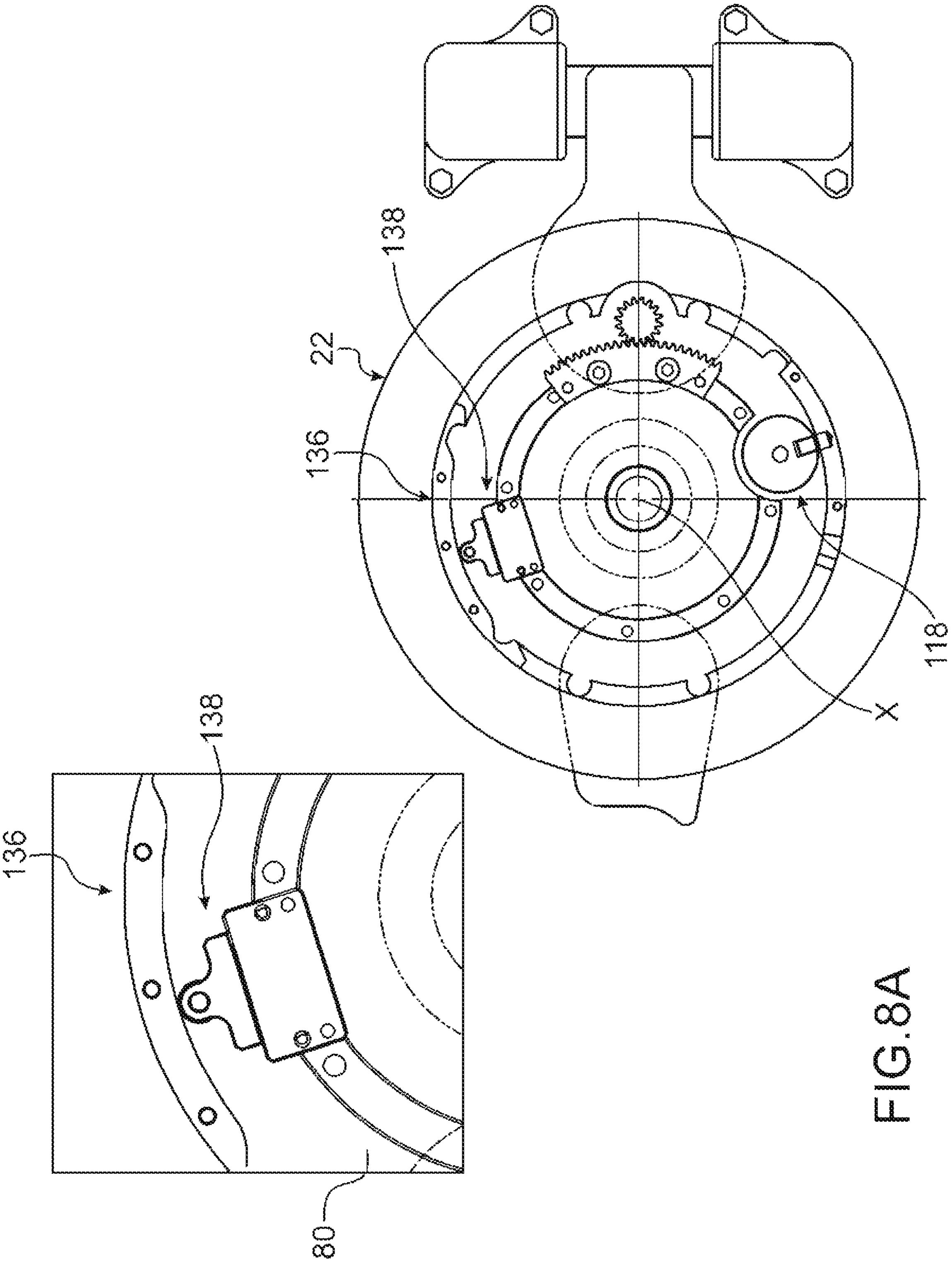
FIG. 8A is a view of the connection device and a detailed view from the cell in an intermediate position during locking of the cell door and the container door.
Figure 8B:
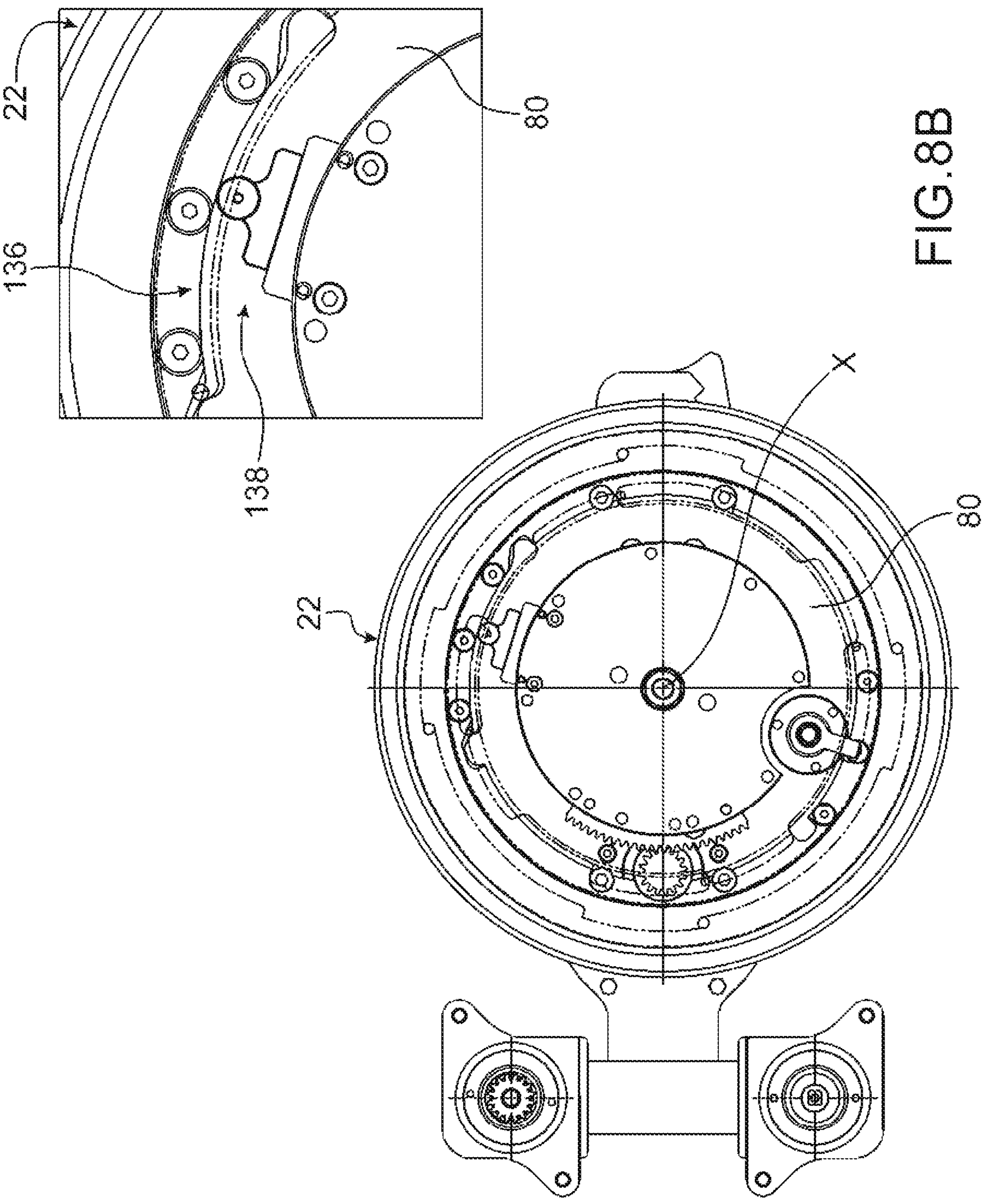
FIG. 8B is a view of the connection device and a detailed view from the container in the intermediate position of FIG. 8A, the door of the container not being shown.
Figure 8C:
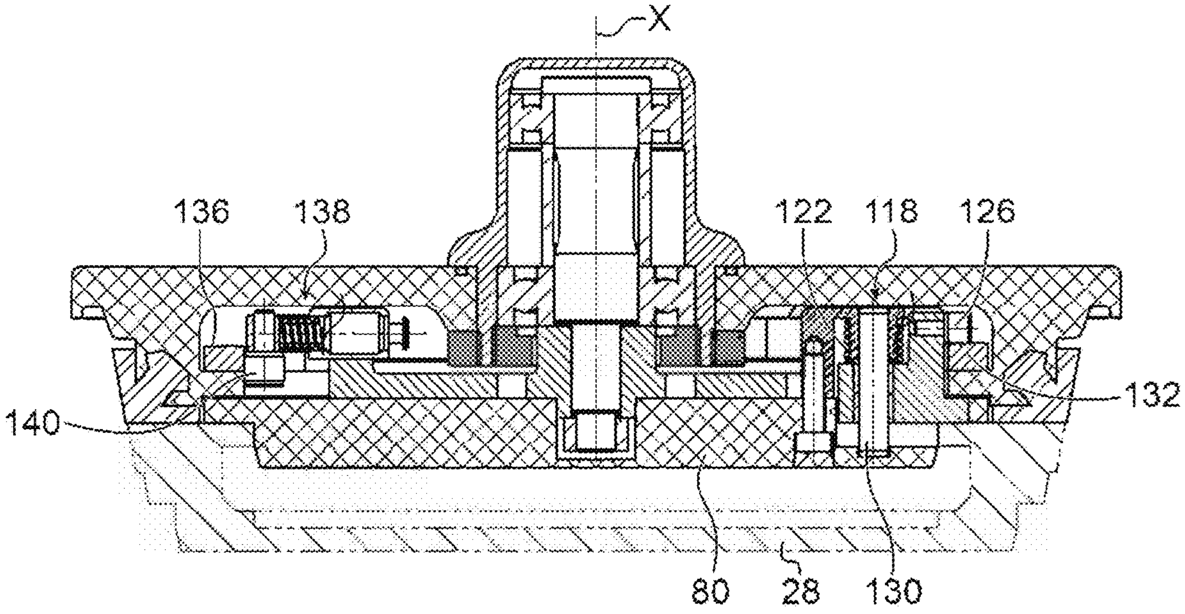
FIG. 8C is a view in longitudinal section of the connection device of the position of FIG. 8A, the container door being shown.
Figure 9A:
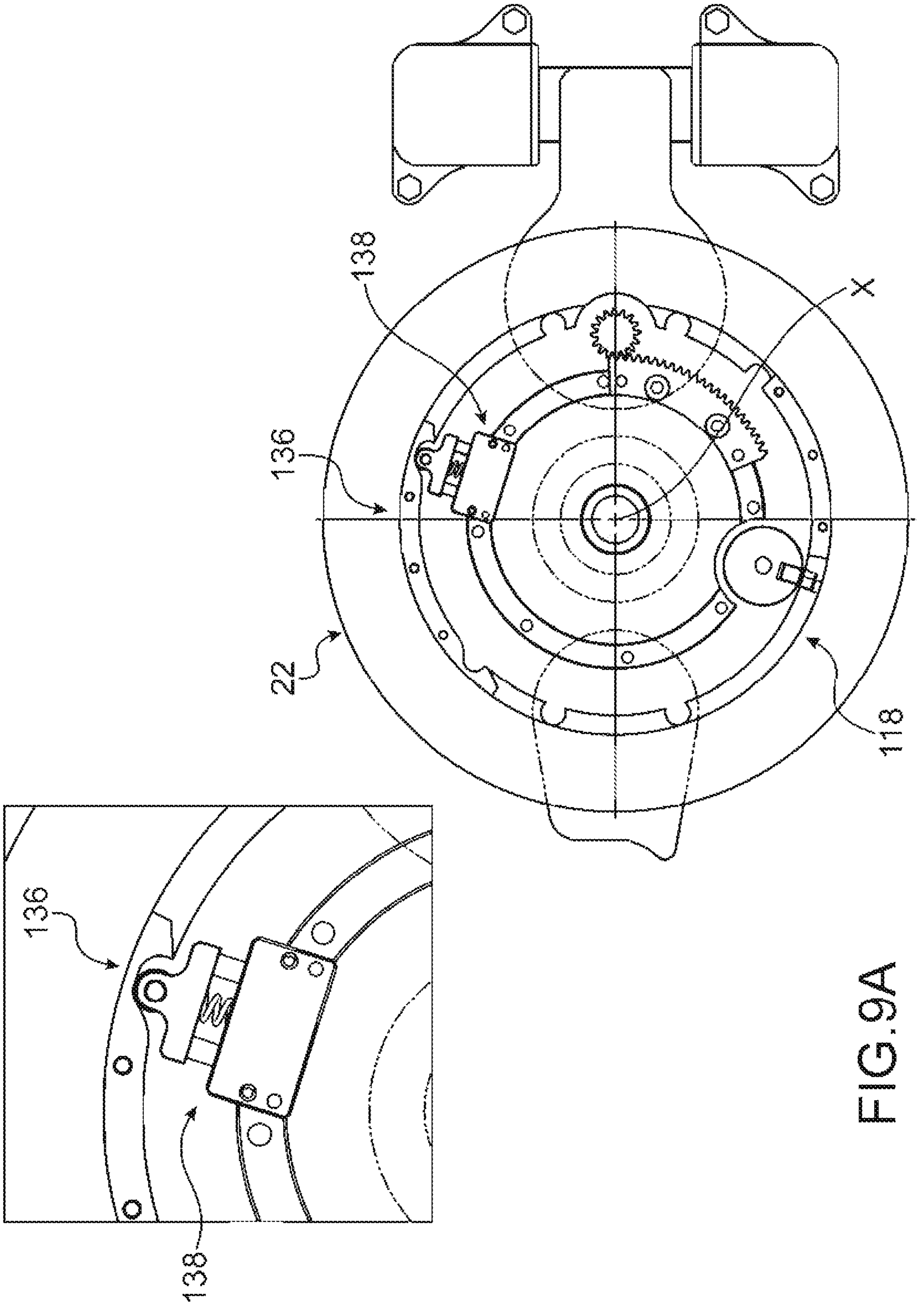
FIG. 9A is a view of the connection device and a detailed view from the cell in a locked position of the cell door and the container door.
Figure 9B:
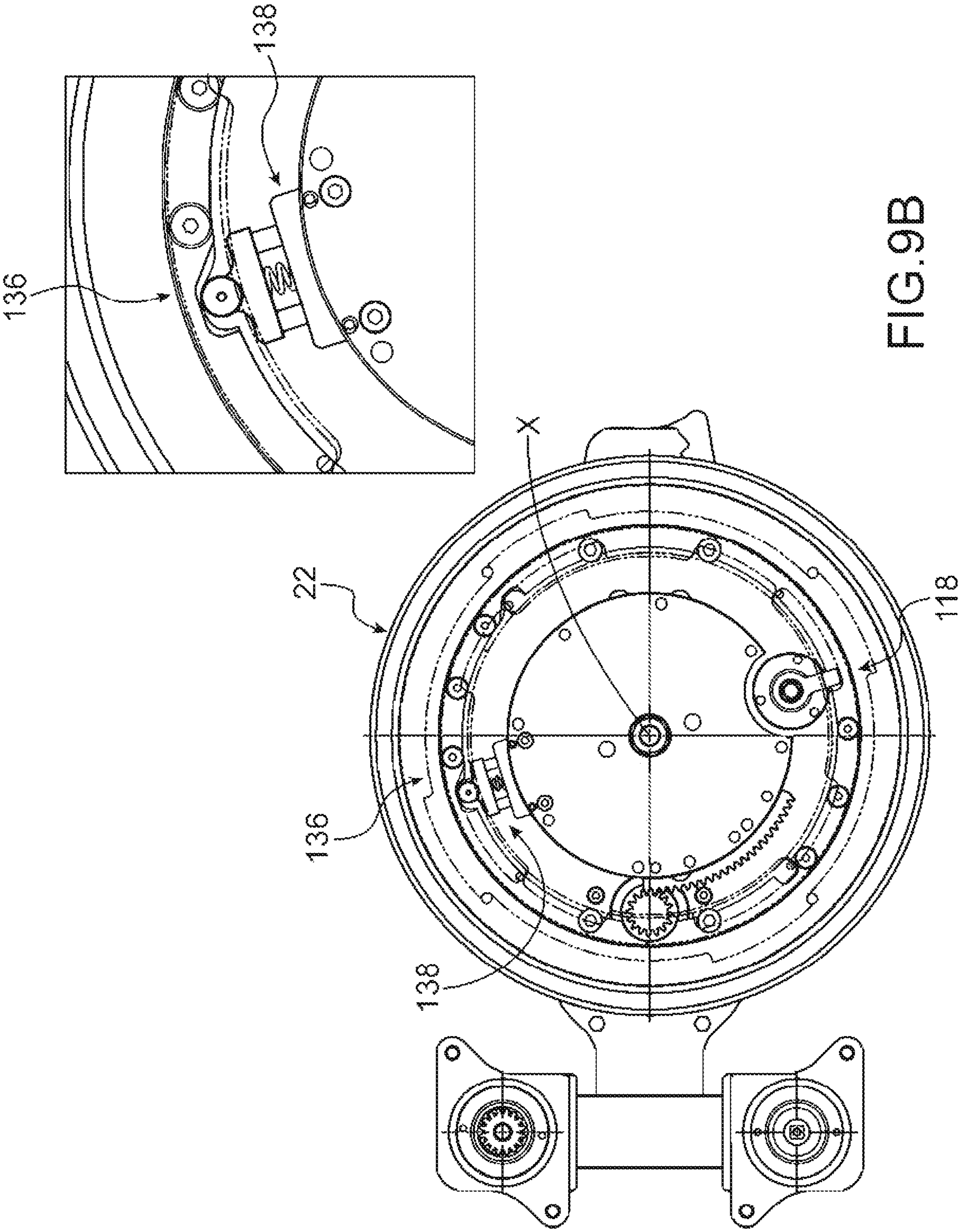
FIG. 9B is a view of the connection device and a detailed view from the container in the locking position of FIG. 9A, the container door not being shown.
Figure 9C:
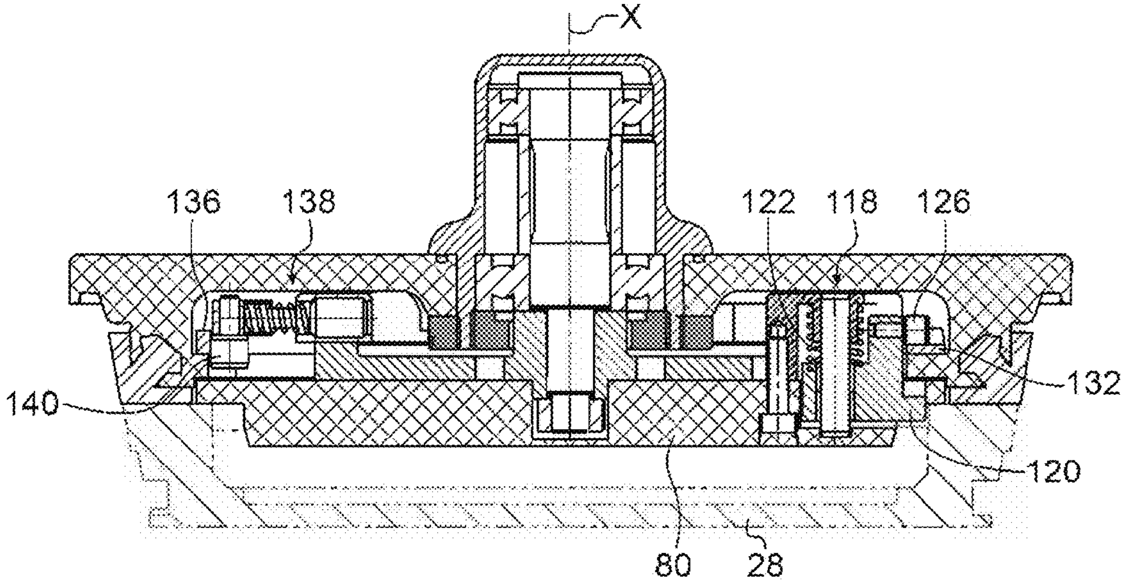
FIG. 9C is a view in longitudinal section of the connection device of the position of FIG. 9A, the container door being shown.

The means 118 are visible in FIG. 6A and in section in FIGS. 7C, 8C and 9C. FIGS. 7C, 8C and 9C show a view in longitudinal section passing through the means 118, but these means carried by the plate 80 rotate about the axis during the connection and disconnection phases, relative to the container door 28 and the cell door 22. Consequently, FIGS. 7C, 8C and 9C show pivoted views of the container door and the cell door during the different phases.

The locking means 118 are disposed between the upstream face of the cell door and the downstream face of the plate 80.

The locking means 118 include a finger 120 protruding radially from the plate 80 in an area between two lugs of the plate 80. The finger 120 is able to be axially retracted inside the plate 80. An elastic means 122, for example a helical spring in the example shown, returns the finger 120 to the outside of the plate 80 in the upstream direction. The finger 120 is visible in FIG. 2.

The locking means 118 also include a roller support 124, carrying the finger 120, which is disposed between the door 22 and the plate 80 and a roller 126 capable of rolling around an axis perpendicular to the longitudinal axis X.

The locking means 118 also include a frame 128 fastened on the plate 80 which carries an axis 130 parallel to the longitudinal axis X on which is mounted capable of sliding the roller support 124. The spring 122 is mounted in compression between the roller support 124 and frame 128 around the axis 130.

The locking means 118 also include a cam 132 formed by a ramp fastened on the cell door, the cam 132 having the shape of an arc of a circle centred on the longitudinal axis X.

The operation of the locking means 118 is as follows. In the unlocked state, i.e. in the absence of the container door, the finger 120 protrudes radially from the securing plate (FIG. 7C). The roller 126 is in the depressed position returned by the spring 122, it is not visible in FIG. 7C.

When placing the container flange 26 in the securing ring 100, the lugs of the container cover 28 are placed between the lugs 82 of the securing plate 80, one of them comes into contact with the finger 120 and due to the axial displacement of the container pushes the finger 120 which penetrates into the plate 80 against the return force of the spring 122. The roller 126 is released from the cam 132 (FIG. 8C).

Figure 6B:
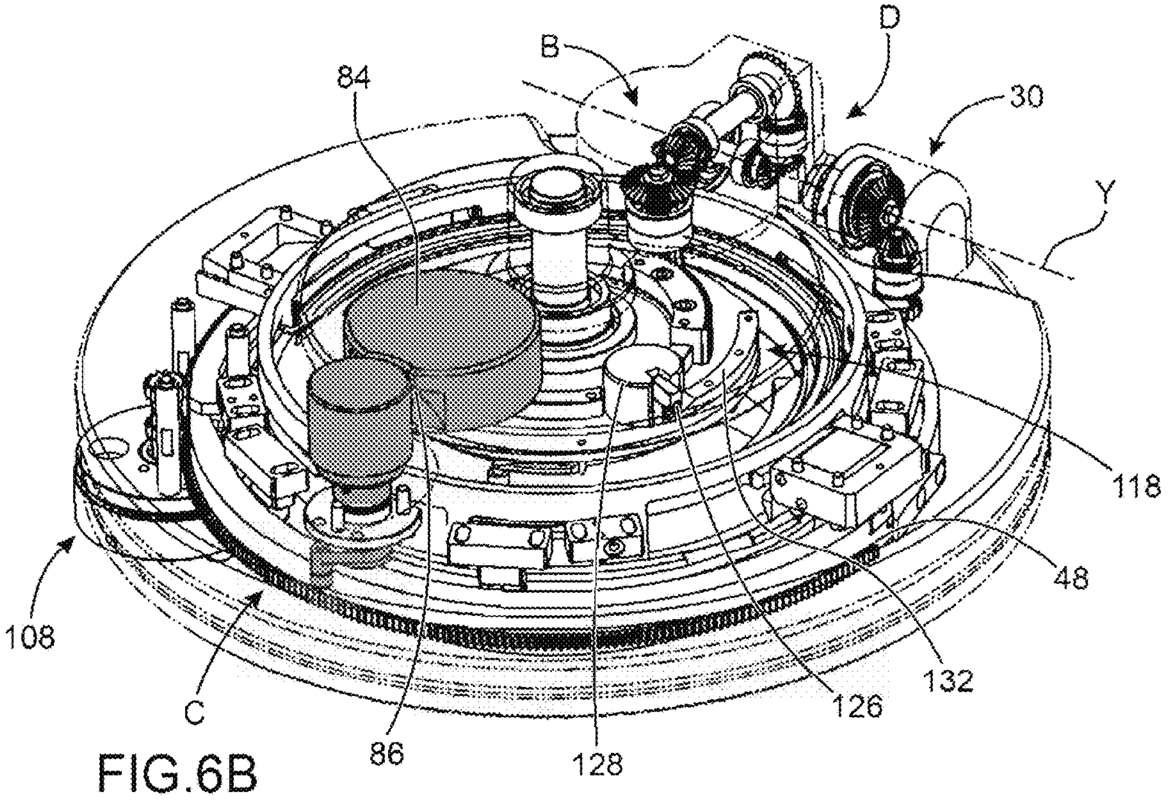
FIG. 6B is a view similar to that of FIG. 6A, the sealed connection device being shown in a locking position of the cell door and the container door.

A new rotation of the toothed ring 48 causes a rotation of the plate, the roller 126 is also driven in rotation and rolls on the cam 132 until the roller 126 is positioned in the lower part of the cam 132 (FIG. 6B).

The finger 120 has then pivoted enough to no longer be facing the lug of the container cover 28. However, due to the return force of the spring 122, the finger is pushed back towards the outside of the plate 80 and forms a stop in rotation for the lug which is therefore blocked by the finger 120 (FIG. 9C).

The device also includes means 134 for immobilising the securing means B in a first position in the absence of the container door and in a second position in the presence of the container door 28 which is locked by the finger 120.

The immobilisation means 134 are carried by the securing plate 80 and the cell door 22. In the example shown and in an advantageous manner, the immobilisation means 134 are partly located on one face of the plate 80 opposite the face intended to be facing the door 28 of the container. Thus they are protected.

In the example shown, the immobilisation means 134 include a cam 136 carried by the door 22 and a cam follower 138 carried by the securing plate 80.

Figure 15:
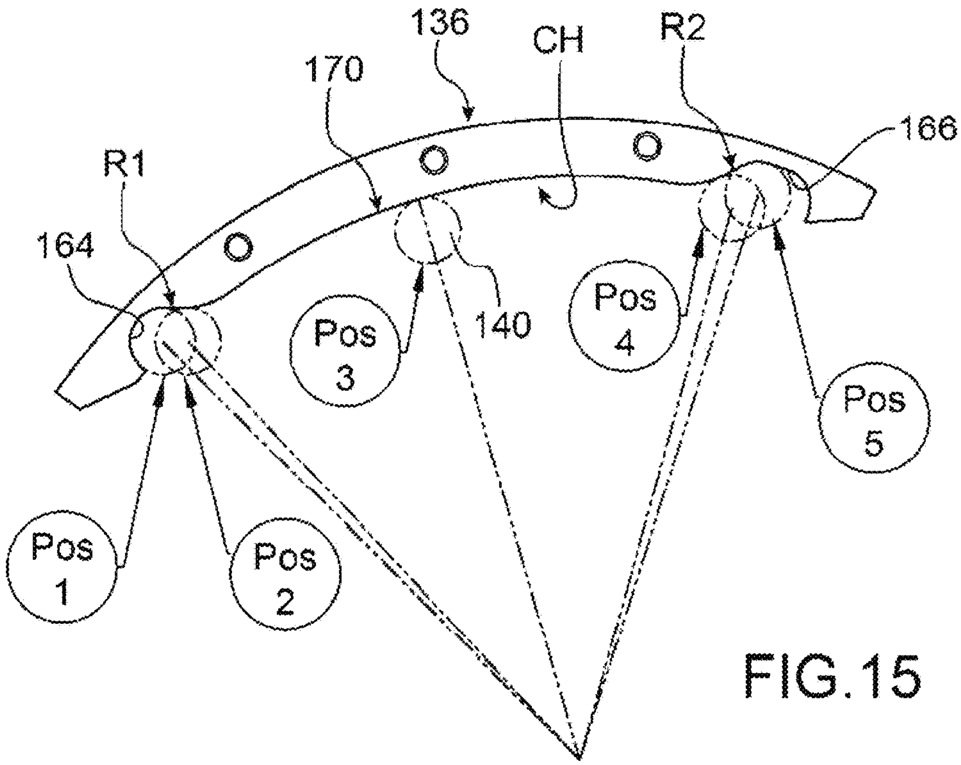
FIG. 15 is a schematic representation of the cam path of the means for indexing in position the plate for securing the cell door and the container door.
Figure 16:
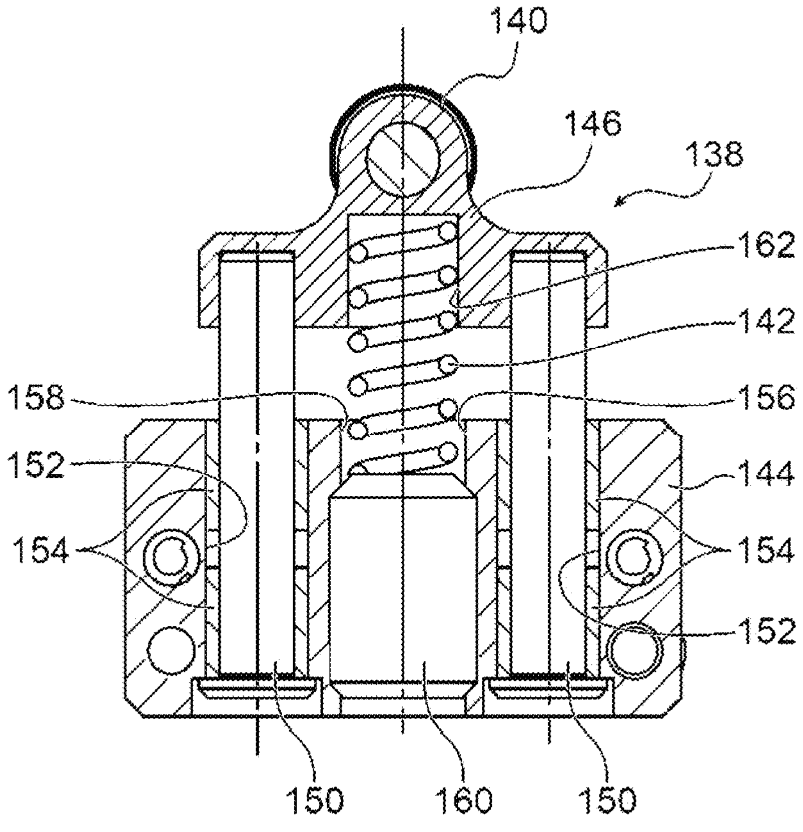
FIG. 16 is a sectional view of a cam follower along a plane orthogonal to the longitudinal axis X.

The cam 136 and the cam follower 138 can be seen in FIGS. 7B, 8B and 9C as well as in FIGS. 15 and 16.

The cam 136 has the shape of an arc of a circle and extends angularly between a first angular end defining a first immobilisation position Pos1 wherein the securing plate 80 is maintained in the absence of the container door 28 and a second angular position Pos5, wherein the securing plate 80 is maintained in the presence of the container door 28 and ensures maintaining the two doors 22, 28 secured to each other. A cam path CH extends between the two angular positions Pos1 and Pos5.

The cam follower 138 extends radially and includes a roller 140 maintained in abutment against the cam path CH by an elastic means 142, for example a helical spring in the example shown.

In FIG. 16, a sectional view of the cam follower can be seen in a plane orthogonal to the axis X.

The cam follower includes a support 144 fastened on the plate 80, a platen 146 carrying the roller 140 which is movable in rotation about an axis parallel to the axis X. The spring 142 is mounted free to react between the support 144 and the platen 146. The platen 146 and the roller 140 are movable along the radial direction to allow the roller 140 to follow the profile of the cam path CH.

In the example shown, two axes 150 are mounted in two parallel passages passing through the support 144 and are fitted at their free end into the platen 146. The two axes are capable of sliding in the support 144 and form sliding guides for the platen 146.

Advantageously, bushes 154, for example made of stainless steel, are mounted in the passages 152 to facilitate the sliding of the axes 150.

In the example shown and also advantageously, the support 144 also includes a cavity 156 intended to receive one end of the spring 142. Advantageously the cavity 156 is formed by a through passage 158 closed by a screw 160, facilitating the mounting of the spring 142.

Alternatively, the bottom of the cavity 156 could be made integrally with the support 144, the spring 142 would then be mounted by the open end of the cavity 156 facing the platen 146.

Advantageously, the other end of the spring 142 is received in a cavity 162 of the platen 146.

It will be understood that other embodiments of the cam follower allowing the roller to follow the cam path does not depart from the scope of the present invention.

In the example shown in FIG. 15, the cam path CH includes several portions between the positions Pos1 and Pos5. In the example shown, the cam path CH includes a first and a second housing 164, 166 at each of the ends of the path, intended to house the roller 140 (shown in dotted lines) of the cam follower, and ensuring the immobilisation of the plate 80 at its two extreme positions. In the example shown, the housings 164 and 166 have different shapes which advantageously allow the mechanical clearances of the container rotations to be accepted. Alternatively, the housings 164 and 166 are identical.

The cam path CH includes a track 170 with constant radius and a first ramp R1 connecting the track 170 to the first housing 164, and a second ramp R2 connecting the track 170 to the second housing 166.

The slopes of the ramps R1 and R2 at least partially condition the force required to bring the roller 140 out of the housings 164, 166. Thus by selecting the values of the slopes, the rendering can be modified at the operator level. Furthermore, the ramps provide assistance when the roller approaches either one of the positions Pos1 and Pos5. The slope values are used to adjust the assistance.

It will be understood that the ramp path can have very different profiles. It may not be symmetrical, for example the slopes of the ramps R1 and R2 may be different. The ramp(s) may include one or more successive slopes to create progressive renderings. Further alternatively, it can be considered that the cam path does not include a track with constant radius but only ramps.

The operation of the immobilisation means 164 will now be described using FIGS. 7A to 9C and 15.

In the absence of a container, the connection device is in the state shown in FIGS. 7A to 7C. The cam follower 138 is in the position designated Pos1 in FIG. 15, the roller 140 is housed in the housing 164 and the plate 80 is angularly immobilised.

Then the container door 28 is placed against the cell door 22. The finger 120 is pushed back (FIG. 8C).

The securing plate 80 is pivoted, which causes the simultaneous rotation of the roller 126 on the ramp 132, and the roller 140 of the cam follower 138 on the cam 136, which comes out of the housing 164, circulates on the ramp R1 (Pos2) then on the track (Pos3 and Pos4) (FIGS. 8A, 8B and 8C).

When the container door 28 is secured to the door 22 of the enclosure and is unlocked, the roller 140 has crossed the ramp R2 and is housed in the housing 166 (Pos5) (FIGS. 9A, 9B and 9C). The securing plate 80 is then immobilised.

The angle between positions Pos1 and Pos2 depends on the construction of the plate, particularly on the angular extension of the cam 136.

In the example shown, the cam follower 138 and the roller 126 are diametrically opposite. Alternatively, the cam follower 138 and the roller 126, and more generally the securing means 134 and the locking means 118 are disposed relative to each other at an angle less than 180°.

Alternatively, the cam 136 is carried by the securing plate 80 and the cam follower 138 is carried by the enclosure door 22.

The third means C for maintaining the cell door closed against the cell flange 18 are visible for example in FIG. 6B in the closed position and in FIG. 10 in the open position.

The door 22 is locked in the position closed on the cell flange 18 by means of a locking cam 84 which is fastened on the inner face of the cell door 22 and a locking roller 86. The locking roller 86 is mounted movable in rotation on the cell flange 18 about an axis parallel to the axial direction X between a locking position wherein the locking roller 86 is in contact with the locking cam 84 and locks the door in the closed position against the cell flange 18, and an unlocking position, wherein the locking roller 86 is spaced from the locking cam, and allows the cell door 22 to be disengaged from the cell flange 18.

The locking roller 86 is carried by a roller holder, one axial end of which includes an actuating roller 88 which cooperates with a radial cam surface 48.3 of the toothed wheel 48 (FIG. 6A).

Alternatively, provision could be made for the locking roller holder to include a pinion meshing with a toothed sector of the toothed wheel.

Advantageously, in the locking position, the locking cam 84 cooperates with security means mounted on the inner face of the door in order to detect the locked position of the cam 84. The fourth means D for opening the door 22 and the cover 28 and thus allowing sealed transfer between the container and the cell, are visible in FIGS. 6A and 11.

The opening means D rotate the cell door 22 and the cover 28 secured to each other by the securing plate 80 about the hinge 30. In the example shown, the means D include a first pinion with straight teeth 90 meshing with a second toothed sector (not visible) of the toothed ring 48 a bevel pinion 92 integral in rotation with the pinion 90. In the example shown, they are located at the two ends of the same axis. The bevel gear 92 meshes with a bevel gear 94 coaxial with the axis of the hinge 30 and integral in rotation therewith. Thus the toothed ring 48, by driving the pinion 90, causes a rotation of the bevel pinion 94 which drives the cell door 22 in rotation about its hinge 30 and allows the transfer between the interior of the container and the interior of the cell.

Seals are provided between the cover and the container flange, between the cell door and the cell flange and between the outer faces of the cell door and the cover so as to ensure a sealed contact between the door 22 and the cover 28 and ensure a confinement of these faces which are in contact with the external environment when they are not in contact.

The toothed ring 48 is composed of several angular actuating sectors, each controlling separate means. Depending on the angle of rotation of the toothed ring, a pinion is meshed by the toothed ring driving given means. The means are not actuated simultaneously but successively and in a given order by disposing the angular sectors in a given direction of rotation. In the example shown, the toothed actuating sectors are disposed in separate planes perpendicular to the longitudinal axis X, which are distinct from the plane containing the toothed drive sector.

A cycle for communicating the inner volume of the container with that of the cell thanks to the connection device according to the invention will now be described by considering a vertical cell wall.

The container flange 26, wherein the cover 28 is disposed, is introduced into the securing ring 100, the lugs 32 of the container flange 26 penetrate into the indentations 104. One of the lugs presses the finger 120. Furthermore, two diametrically opposite lugs 32 come into contact with the actuating rods 38, cause their pivoting in the clockwise direction and the pivoting of the locking rods 40. The finger 44 blocks the locking rods 40 in position. The container flange 26 is then held against the wall 14 of the cell. The operator can drop the container.

The operator then turns the crank 108 in the clockwise direction, which rotates the securing ring 100 in the counterclockwise direction, which is free to rotate, since the locking rods 40 have tilted, their ends 40.2 having been disengaged from the notches 102.3. The securing ring 100 rotates, the lugs 32 are then held by a bayonet connection thanks to the securing ring 100. The container flange 26 is then secured to the cell flange 18.

Then, the operator again turns the crank 108 in the clockwise direction, which rotates the toothed ring 48 in the counterclockwise direction, the toothed sector 48.2 meshes with the pinion 62 which causes the rotation of the securing plate 80. The plate 80 then ensures securing the cell door 22 and the container cover 28. Simultaneously the roller 126 rolls on the ramp 132 to its low position and the finger 120 is pushed to the outside of the plate 80 (FIG. 6B), one of the lugs of the cover 28 is then blocked against the finger 120. Simultaneously the roller 140 of the cam follower of the securing means is housed in the second housing 166, immobilising the securing plate 80. No rotation of the cover 28 relative to the cell door 22 is possible in the absence of handling of the securing plate.

The operator further turns the crank 108 in the clockwise direction, the toothed sector 48.2 moves away from the pinion 62 and the radial cam path meets the actuating roller 88 causing the roller holder to pivot and the locking roller 86 to be spaced from the locking cam 84. The door 22 is then released from the cell flange 18.

The operator further turns the crank 108 in the clockwise direction, the toothed sector meshes with the pinion 90, causing the door 22 and the cover 28 to rotate about the hinge 30.

Figure 11:
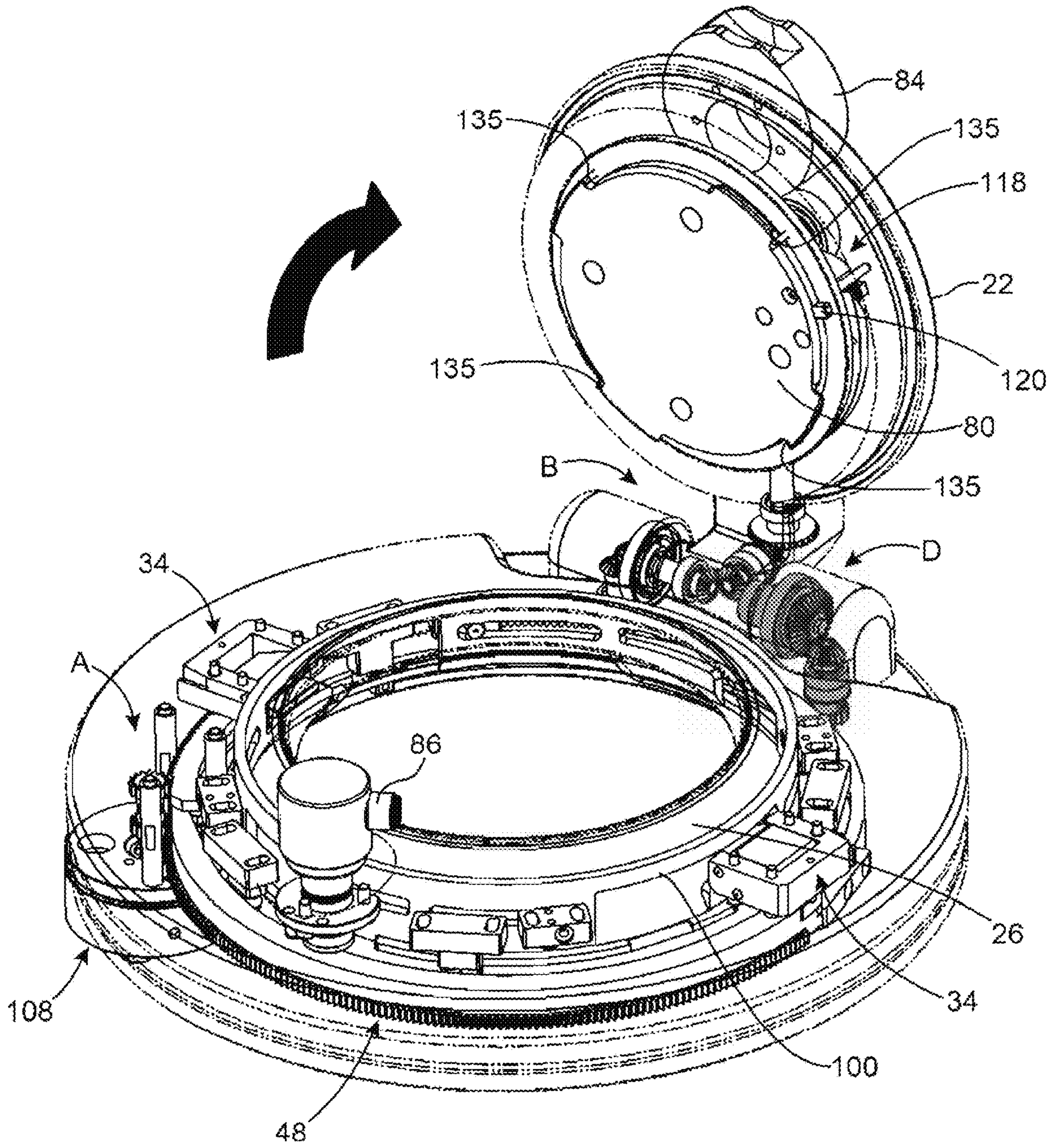
FIG. 11 is a perspective view in open position of the connection device, the container cover having been omitted.

The passage between the interior of the cell and the interior of the container is then opened as shown in FIG. 11 (the cover 28 is not shown).

In this position, the cover cannot be separated from the door due to the presence of the finger 120. The movement of one lug of the cover 28 is limited by the finger 120 and a stop 135, formed by a pin fastened in the plate 80. In the example shown, four stops 135 are distributed on the plate 80. Therefore, the cover 28 cannot pivot enough relative to the door 22 to separate them. The retraction of the finger 120 is only possible by the rotation in the direction opposite to the securing plate 80, however this rotation in the opposite direction is only possible after closing the access between the two volumes. Consequently, the separation of the cover and the door is prevented when the passage between the cell and the container is open. Thus there is no risk of pollution of the interior of either one of the volumes by the outer faces of the cell and of the container.

The closure of the passage and the separation of the container from the cell are carried out according to the above steps in reverse order. For this purpose, the operator pivots the crank 108 in the counterclockwise direction, causing:

resetting the door 22 and the cover 28 in their respective flanges 18, 26, then returning the locking roller 86 in position in the locking cam 84, rotating the plate 80 in the clockwise direction which locks the cover 28 in the container flange 26 and disengages the door 22 and the cover 26, simultaneously the finger 120 penetrates into the plate 80 thanks to the cam 132, the securing ring 100 then pivots in the clockwise direction, releasing the lugs 32 from the container flange 26, finally, the snap-fitting devices 34 are deactivated so as to release the locking rods 40. The container can then be removed from the securing ring.

The connection device allows a connection between a container and a safe cell avoiding any malfunction due to the seals between the container door and the cell door.

Furthermore, the connection device allows connection without rotation of the container, which simplifies the operations for the operator and allows to handle fragile objects contained in the container.

The connection device may provide greater ease of cleaning since it may not include any element inside the cell. The whole mechanism is outside the cell.

The exterior control provides greater handling for the operator.

The connection device further allows improving the closing/opening rates per day, allowing a gain in productivity, all the transfer steps being carried out by the handling of the external crank or by activation of the motor.

Moreover, it has easier maintenance and repair due to its simple structure, especially when its actuation means are located outside the cell. Moreover, the disposition of the actuation means outside allows motorisation of the device in a very simple manner. By disposing the actuation means outside the cell, it is no longer in contact with the sterilizing agent, which reduces the risk of damage and malfunction.

Furthermore, security is improved, since in the case of actuation from the outside, it is no longer necessary to access the interior of the cell by means of gloves sealingly mounted through a wall of the cell to activate the mechanism, nor for maintenance.

Alternatively, it can be considered that the securing ring 100 is rotated via the toothed ring 48, the toothed ring would then be the single member for controlling all the steps.

What is claimed is:

1. An assembly including a first enclosed volume and a sealed connection device between the first enclosed volume and a second enclosed volume, the first enclosed volume including a first flange and a first door sealingly closing an opening delimited by the first flange, and the second enclosed volume including a second flange and a second door sealingly closing a second opening delimited by the second flange, the second door being secured to the second flange by a bayonet connection, said connection device being mounted on a wall of the first enclosed volume and comprising:

a securing ring mounted movable in rotation relative to the first flange about a longitudinal axis and configured to secure the first and second flanges to each other via a first bayonet connection such that the second flange is immobilized relative to the first flange, a securing plate mounted movable in rotation on an outer face of the first door about the longitudinal axis and capable of being secured to an outer face of the second door by a second bayonet connection, said securing plate being such that a first part of a rotational displacement of the securing plate is intended to secure the first door and the second door and a second part of the rotational displacement of the securing plate is intended to unlock the second door relative to the second flange, a first pinion for opening a passage between the first and the second enclosed volume, a control ring capable of being rotated about the longitudinal axis, said first pinion meshing with a first toothed sector of the control ring, wherein the rotation of said control ring actuates at least the securing plate and the first pinion, a cam and a cam follower, the cam being fixed to the first door and the cam follower being fixed to the securing plate or vice versa, said cam and said cam follower cooperating so as to immobilize the securing plate relative to the first door in a first position in the absence of the second door and in a second position in the presence of the second door in a state wherein the first door and the second door are secured and the second door is unlocked relative to the second flange, a first device for actuating said control ring and a second device for actuating the securing ring.

2. The assembly according to claim 1, wherein the cam follower is fixed to a face of the securing plate opposite the first door.

3. The assembly according to claim 1, wherein the cam includes a cam path extending substantially along an arc of a circle and comprising at a first angular end, a first housing and at a second angular end a second housing, for housing and immobilising the cam follower in one of the first and second positions, and at least one first ramp in continuation of the first housing in the direction of the second housing, and a second ramp in continuation of the second housing in the direction of the first housing.

4. The assembly according to claim 3, wherein the cam path includes a track with constant radius connecting the first ramp and the second ramp.

5. The assembly according to claim 1, wherein the cam follower includes a platen carrying a roller that circulates on the cam path and a fixed support relative to which the platen is configured to slide.

6. The assembly according to claim 1, further comprising a second pinion meshing with a second toothed sector carried by the control ring, a rotational displacement of the control ring causing a rotation of the securing plate.

7. The assembly according to claim 6, further comprising a gear train coupled to the securing plate to rotate said securing plate, said gear train being driven by said second pinion.

8. The assembly according to claim 7, said second pinion having straight teeth meshing with the second toothed sector and a bevel gear.

9. The assembly according to claim 1, including locking means for locking the first door and the second door to each other when they are spaced from the first and second flanges.

10. The assembly according to claim 9, wherein said locking means include a finger movably mounted in the securing plate, said finger being able to be retracted in the securing plate when the second door is disposed against the first door and capable of protruding from the securing disc when the securing disc secures the first door and the second door, the finger blocking the rotation of the second door relative to the first door with a stop.

11. The assembly according to claim 10, wherein said finger includes a roller and wherein said locking means include a cam carried by an outer face of the first door ensuring the return to the retracted position of the finger in the securing disc in the phase of separation of the first and second enclosed volumes.

12. The assembly according to claim 1, wherein the first actuating device also forms the second actuation device, and includes a crank disposed outside the first enclosed volume.

13. The assembly according to claim 1, wherein the first door is articulated relative to the first flange around a hinge of axis orthogonal to the longitudinal axis, and wherein said pinion is coupled to said hinge, the rotational displacement of the control ring causing rotation of the first door about the hinge.

14. The assembly according to claim 1, wherein the control ring includes a toothed drive sector cooperating with a third pinion.

15. The assembly according to claim 1, further comprising means for releasing the first door relative to the first flange.

16. The assembly according to claim 15, said means comprising a locking cam disposed on an inner face of the first door and a locking roller mounted movable in rotation on the first flange, said locking roller being movable between a locking position where the locking roller is in contact with the locking cam to thereby lock the first door in a closed position against the first flange, and an unlocked position where the locking roller is spaced from the locking cam to thereby permit the first door to be disengaged from the first flange.

* * * * *